US008884496B2

(12) United States Patent
Lipson et al.

(10) Patent No.: US 8,884,496 B2
(45) Date of Patent: Nov. 11, 2014

(54) FLUID CURRENT ENERGY CAPTURE APPARATUS AND METHOD

(75) Inventors: Hod Lipson, Ithaca, NY (US); Shuguang Li, Xi'an (CN)

(73) Assignee: Cornell University, Ithaca, NY (US)

( * ) Notice: Subject to any disclaimer, the term of this patent is extended or adjusted under 35 U.S.C. 154(b) by 440 days.

(21) Appl. No.: 13/115,547

(22) Filed: May 25, 2011

(65) Prior Publication Data

US 2011/0291527 A1    Dec. 1, 2011

Related U.S. Application Data

(60) Provisional application No. 61/348,030, filed on May 25, 2010.

(51) Int. Cl.
    *H02N 2/18*        (2006.01)
(52) U.S. Cl.
    USPC .......................................... 310/339; 310/330
(58) Field of Classification Search
    USPC ................................................. 310/330, 339
    See application file for complete search history.

(56) References Cited

U.S. PATENT DOCUMENTS

| 7,528,528 | B2 * | 5/2009 | Zanella et al. | 310/339 |
| 2007/0114890 | A1 * | 5/2007 | Churchill et al. | 310/339 |
| 2007/0180889 | A1 * | 8/2007 | Murayama et al. | 73/1.79 |
| 2007/0228890 | A1 * | 10/2007 | Zanella et al. | 310/339 |
| 2010/0052324 | A1 * | 3/2010 | Priya | 290/50 |
| 2010/0253088 | A1 * | 10/2010 | Weinberger et al. | 290/1 C |

OTHER PUBLICATIONS

Anton, S.R., and Sodano, H.A., 2007, "A Review of Power Harvesting Using Piezoelectric Materials", 2003-2006, Smart Materials and Structures, 16, pp. R1-R21.
Paradiso, J.A., Starner, T., 2005, "Energy Scavenging for Mobile and Wireless Electronics," IEEE Pervasive Computing, 4(1), pp. 18-27.
Priya, S., 2007, "Advances in Energy Harvesting Using Low Profile Piezoelectric Transducers", Journal of Electrocerarnics, 19(1), pp. 167-184.
Roundy, S., Wright, P.K., and Rabaey, J., 2003, "A Study of Low Level Vibrations as a Power Source for Wireless Sensor Nodes", Computer Communications, 26(11), pp. 1131-1144.

(Continued)

*Primary Examiner* — Derek Rosenau
*Assistant Examiner* — Bryan Gordon
(74) *Attorney, Agent, or Firm* — William Greener; Frederick J.M. Price; Bond, Schoeneck & King, PLLC

(57) ABSTRACT

One aspect of the present invention involves investigation of the principles and feasibility of the harvesting energy from the wind in constrained spaces, such as around buildings, as an alternative to conventional rotary wind turbines. Some embodiments involve the idea of harvesting energy from wind induced vibration instead of wind driven rotation. Some embodiments are a tree-like generator for wind energy harvesting including multiple vibrating elements. Some embodiments include a "piezo stalk and leaf" as an element of a plant-like generator. In some embodiments, a leaf, made at least in part from piezoelectric type materials is capable of generating electrical power through wind induced vibrations. Some embodiments include a cantilever piezo-electric material containing stalk member that exhibits at least one mode of cantilever motion. Some embodiments include an elongated piezoelectric material containing stalk member (which may or may not qualify as a cantilever), where a pendular member (or leaf member) is mechanically connected to the stalk and extends in a direction substantially non-parallel (for example, perpendicular to) the direction of elongation of the stalk.

18 Claims, 11 Drawing Sheets

(56) References Cited

OTHER PUBLICATIONS

Roundy, S., and Wright, P.K., 2004, "A Piezoelectric Vibration Based Generator for Wireless Electronics", Smart Materials and Structures, 13(11), pp. 1131-1142.

Taylor, G. W., Burns, J. R., Kamman, S. M., Powers, W. B., and Welsh, T. R., 2001,"The Energy Harvesting Eel: A Small Subsurface Ocean/River Power Generator", IEEE Journal of Oceanic Engineering, 26(4), pp. 539-547.

Allen, J. J., and Smits, A.J., 2001, "Energy Harvesting Eel", Journal of Fluids and Structures, 15, pp. 629-640.

Priya, S., 2005, "Modeling of Electric Energy Harvesting Using Piezoelectric Windmill", Applied Physics Letter, 87, pp. 184101.

Myers, R., Vickers, M., Kim, H., and Priya, S., 2007, "Small Scale Windmill," Applied Physics Letter, 90, pp. 054106.

Piezoelectric Trees-aesthetically pleasing wind power, 2002, http://www.halfbakery.com/idea/Piezoelectric_20Trees, pp. 1-6.

Shukla, S., Govardhan, R.N., and Arakeri, J.H., 2009, "Flow Over a Cylinder with a Hinged-Splitter Plate", Journal of Fluids and Structures, article in press, doi:10.1016/j.jfluidstructs.2008.11.004, pp. 713-720.

Huang, L., 1995, "Flutter of Cantilever Plates in Axial Flow", Journal of Fluids and Structures, 9, pp. 127-147.

Argentina, M., and Mahadevan, L., 2005, "Fluid-Flow Induced Flutter of a Flag", Proceedings of the National Academy of Sciences, 102, pp. 1829-1834.

Tang, L., and Paidoussis, M.P., 2007, "On the Instability and the Post-Critical Behavior of Two-Dimensional Cantilevered Flexible Plates in Axial Flow", Journal of Sound and Vibration, 305, pp. 97-115.

Eloy, C. Souilliez, C., and Schouveiler, L., 2007, "Flutter of a Rectangular Plate", Journal of Fluids and Structures, 23, pp. 904-919.

Zhang, J., Childress, S., Libchaber, A., and Shelley, M., 2000, "Flexible Filaments in a Flowing Soap Film as a Model for One-Dimensional Flags in a Two-Dimensional Wind", Nature, 408, pp. 835-839.

Connell, B.S.H., and Yue, D,K.P., 2007, "Flapping Dynamics of a Flag in a Uniform Stream", Journal of Fluid Mechanics, 581, pp. 33-67.

Mustafa, G., and Ertas, A., 1996, "Dynamics and Bifurcations of a Coupled Column-Pendulum Oscillator", Journal of Sound and Vibration, 182(3), pp. 393-413.

Cuvalci, O., and Ertas, A., 1996, "Pendulum as Vibration Absorber: Experiments and Theory", Journal of Vibration and Acoustics, 118, pp. 558-566.

Cuvalci, O., 2000, "The Effect of Detuning Parameters on the Absorption Region for a Coupled System: a Numerical and Experimental Study", Journal of Sound and Vibration, 229(4), pp. 837-857.

Nayfeh, A.H., and Mook, D.T., 1995, "Energy transfer from high-frequency to low-frequency modes in structures", Journal of Vibration and Acoustics, 117, pp. 186-195.

Alben, S., and Shelley, M., 2008, "Flapping States of a Flag in an Inviscid Fluid: Bistability and the Transition to Chaos", Physical Review Letters, 100, pp. 074301-01 to 074301-4.

Wang, Z, and Xu, Y., 2007, "Vibration Energy Harvesting Device based on Air-Spaced Piezoelectric Cantilevers", Applied Physics Letter, 90, pp. 263512.

Chen, C.T., Islam, R.A., and Priya, S., Mar. 2006, "Electric Energy Generator", IEEE Transactions on Ultrasonics, Ferroelectrics, and Frequency Control, 53(3), pp. 656-661.

Vestas Wind Systems A/S, Wind Turbine Products' Brochures of V52-850 kW and V90-3.0 MW, http://www.vestas.com/, 2011.

N. S. Hudak and G. G. Amatucci, J. Appl. Phys., 2008, 103, pp. 101301.

MicroBelt tech sheet, 2008, Humdinger Winder Energy, LLC, http://www.humdingerwind.com/, p. 1.

H. D. Akaydin, N. Elvin, and Y. Andreopoulos, Journal of Intelligent Material Systems and Structures, Sep. 2010, vol. 21, pp. 1263-1278.

H. D. Akaydin, N. Elvin, and Y. Andreopoulos, Wake of a cylinder: a paradigm for engery harvesting with piezoelectric materials, Exp. Fluids, 2010, 49, pp. 291-304.

S. J. Oh, et al., Development of a Tree-shaped Wind Power System Using Piezoelectric Materials, International Journal of Energy Research, 2010; 34:431-437, Published online Dec. 1, 2009, Wiley InterScience, http://onlinelibrary.wiley.com/doi/10.1002/er.1644.

Dickson, Richard Malcolm, New Concepts in Renewable Energy, 2008, all, but especially pp. 29-30.

* cited by examiner

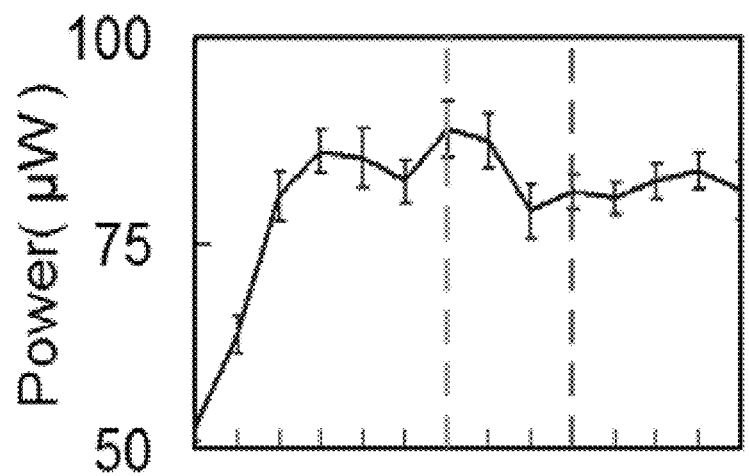
Fig. 22
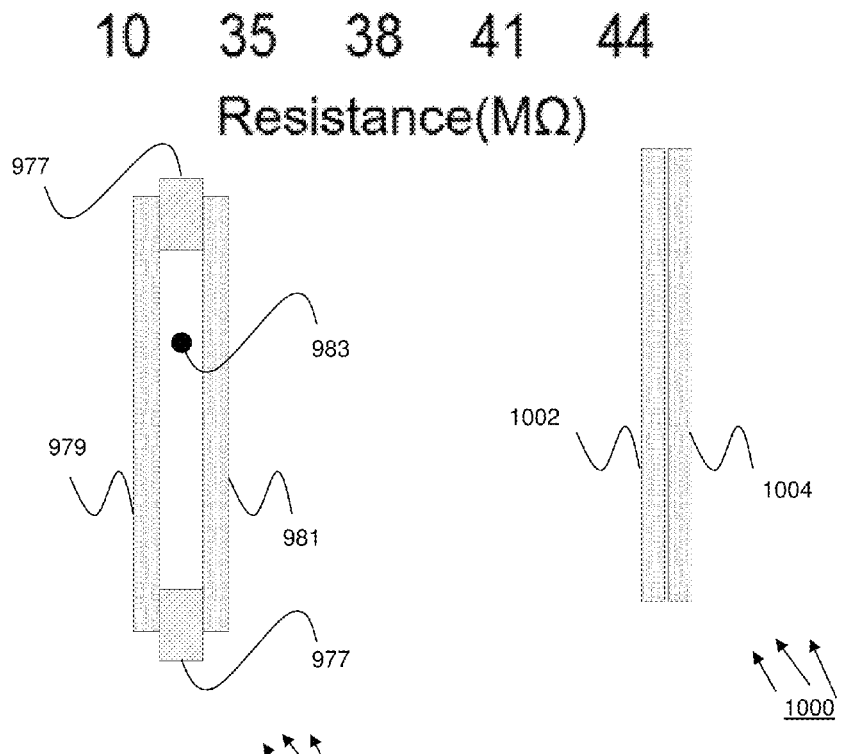
Fig. 23
Fig. 24

FLUID CURRENT ENERGY CAPTURE APPARATUS AND METHOD

RELATED APPLICATION

The present application claims priority to U.S. provisional patent application No. 61/348,030, filed on May 25, 2010; all of the foregoing patent-related document(s) are hereby incorporated by reference herein in their respective entirety(ies).

BACKGROUND OF THE INVENTION

1. Field of the Invention

The present invention relates to devices for converting the kinetic energy of fluid currents into other forms of energy and more particularly to devices for converting the kinetic energy of wind currents into electrical energy.

2. Description of the Related Art

Renewable and sustainable energy research has attracted much attention, probably at least in part because of diminishing supplies and rising prices for fuel in recent years. Researchers have been searching for a practical alternative to petroleum and coal for generation of electrical power. Hydroelectric power stations and wind turbines are two of the most successful solutions in this field. Compared to hydroelectric energy, wind power is much more environmentally friendly of these two alternative energy solutions. Nevertheless, there are some limitations of traditional wind power generators. For example, using a large rotational turbine to harvest energy from the air requires significant financial and infrastructure investment, large real-estate area and long term commitment.

Much previous work has focused on using piezoelectric materials to convert mechanical vibration energy into electrical power. Some research has reviewed recent devices and applications of piezoelectric materials based energy harvesters.

Some research has developed a vibration based piezoelectric generator with a beam configuration, and provided a model for estimating the output voltage and power with experimental validation.

Some research has developed cantilevered power harvesting prototypes with three types of piezoelectric materials: lead zirconium titanate ceramic (PZT), macro fiber composite (MFC), and Polyvinylidene Fluoride (PVDF). The power generating capabilities of these three materials, under large vibration amplitudes, have been compared.

In order to harvest fluid induced energy, some research has designed an "energy harvesting eel" using PVDF, which could convert the flow energy to electrical power in oceans and rivers through a flow induced oscillating motion on the PVDF film, which may be laid over a bluff body.

Some research has designed and optimized a small windmill prototype to extract energy from airflow. In this research a wind driven mechanism was used to bend a series of piezoelectric bimorphs transducers, with the wind driving the rotation of the small windmill.

A variety of other piezoelectric and magnet materials based wind energy generation concepts are known. One proposed device (which has not necessarily been made or enabled) uses passive wind harvesting technology, Polyvinylidene Fluoride (PVDF) and/or piezoelectric ceramic fiber composite material woven into a textile-like material forming artificial leaves and leaf nodes. In this proposed device, each textile "leaf" moves under the force of the wind to transducer electrical power from the wind. The device does not include a cantilever stalk member that undergoes vibrational motion in the manner of a cantilevered member. This proposed device does not include a flat, generally planar piezoelectric stem. This proposed device also does include a pendular member designed to promote cantilevered member type vibrational motion in a cantilever stalk member. The proposed device does not include a plastic or polymer pendular member.

The following published documents may also include helpful background information: (1a) Anton, S. R., and Sodano, H. A., 2007, "A Review of Power Harvesting Using Piezoelectric Materials (2003-2006)," Smart Materials and Structures, 16, pp. R1-R21; (2a) Paradiso, J. A., Starner, T., 2005, "Energy Scavenging for Mobile and Wireless Electronics," IEEE Pervasive Computing, 4(1), pp. 18-27; (3a) Sodano, H A., Park, G. and Inman, D. J., 2004, "A Review of Power Harvesting from Vibration using Piezoelectric Materials," The Shock and Vibration Digest, 36(3), pp. 197-205; (4a) Priya, S., 2007, "Advances in Energy Harvesting Using Low Profile Piezoelectric Transducers," Journal of Electroceramics, 19(1), pp. 167-184; (5a) Roundy, S., Wright, P. K., and Rabaey, J., 2003, "A Study of Low Level Vibrations as a Power Source for Wireless Sensor Nodes," Computer Communications, 26(11), pp. 1131-1144; (6a) Roundy, S., and Wright, P. K., 2004, "A Piezoelectric Vibration Based Generator for Wireless Electronics," Smart Materials and Structures, 13(11), pp. 1131-1142; (7a) Shen, D., Choe, S., and Kim, D., 2007, "Analysis of Piezoelectric Materials for Energy Harvesting Devices under High-g Vibrations" Japanese Journal of Applied Physics, 46(10A), pp. 6755-6760; (8a) Sodano, H. A, Park, G. and Inman, D. J., 2004, "Estimation of Electric Charge Output for Piezoelectric Energy Harvesting," Journal of Strain, 40(2), pp. 49-58; (9a) Taylor, G. W., Burns, J. R., Kamman, S. M., Powers, W. B., and Welsh, T. R., 2001, "The Energy Harvesting Eel: A Small Subsurface Ocean/River Power Generator," IEEE Journal of Oceanic Engineering, 26(4), pp. 539-547; (10a) Allen, J. J., and Smits, A. J., 2001, "Energy Harvesting Eel" Journal of Fluids and Structures, 15, pp. 629-640; (11a) Priya, S., 2005, "Modeling of Electric Energy Harvesting Using Piezoelectric 'Windmill," Applied Physics Letter, 87, pp. 184101 (hereinafter "Priya Modeling"); (12a) Myers, R., Vickers, M., Kim, H., and Priya, S., 2007, "Small Scale Windmill," Applied Physics Letter, 90, pp. 054106 (hereinafter "Priya Small Scale Windmill"); (13a) Ward, L. "Wind Belt—the Latest in Wind Power." Ecofriend. November 2007. Popular Mechanics, 30 Jan. 2008; (14a) Piezoelectric Trees-aesthetically pleasing wind power, 2002, http://www.halfbakery.com/idea/Piezoelectric_20Trees; (15a) Dickson, R. M., 2008, "New Concepts in Renewable Energy," especially pp. 33-34; (16a) Williamson, C. H. K., 1996, "Vortex Dynamics in the Cylinder Wake," Annual Review of Fluid Mechanics, 28, pp. 477-539; (17a) Measurement Specialties, Inc, 2008, "Piezo Film Product Guide and Price List," pp. 4-6; (18a) Shukla, S., Govardhan, R. N., and Arakeri, J. H., 2009, "Flow Over a Cylinder with a Hinged-Splitter Plate," Journal of Fluids and Structures, article in press, doi:10.1016/j.jfluidstructs.2008.11.004; (19a) Huang, L., 1995, "Flutter of Cantilever Plates in Axial Flow," Journal of Fluids and Structures, 9, pp. 127-147; (20a) Argentina, M., and Mahadevan, L., 2005, "Fluid-Flow Induced Flutter of a Flag," Proceedings of the National Academy of Sciences, 102, pp. 1829-1834; (21a) Tang, L., and Paidoussis, M. P., 2007, "On the Instability and the Post-Critical Behavior of Two-Dimensional Cantilevered Flexible Plates in Axial Flow," Journal of Sound and Vibration, 305, pp. 97-115; (22a) Eloy, C. Souilliez, C., and Schouveiler, L., 2007, "Flutter of a Rectangular Plate," Journal of Fluids and Structures, 23, pp. 904-919; (23a) Zhang, J., Childress, S., Libchaber, A., and Shelley, M., 2000, "Flexible Filaments in a Flowing Soap Film as a Model for One-Dimensional Flags in a Two-Dimensional Wind," Nature, 408, pp. 835-839; (24a) Connell, B. S. H., and Yue, D. K. P., 2007, "Flapping Dynamics of a Flag in a Uniform Stream," Journal of Fluid Mechanics. 581, pp. 33-67; (25a) Mustafa, G., and Ertas, A., 1996, "Dynamics and Bifurcations of a Coupled Column-Pendulum Oscillator," Journal of Sound and Vibration, 182(3), pp. 393-413; (26a) Cuvalci, O., and Ertas, A., 1996, "Pendulum as Vibration Absorber Experiments and Theory," Journal of Vibration and Acoustics, 118, pp. 558-566; (27a) Cuvalci, O., 2000, "The Effect of Detuning Parameters on the Absorption Region for a Coupled System: a Numerical and Experimental Study," Journal of Sound and Vibration, 229(4), pp. 837-857; (28a) Nayfeh, A. H., and Mook, D. T., 1995, "Energy transfer from high-frequency to low-frequency modes in structures," Journal of Vibration and Acoustics, 117, pp. 186-195; (29a) Alben, S., and Shelley, M., 2008, "Flapping States of a Flag in an Inviscid Fluid: Bistability and the Transition to Chaos," Physical Review Letters, 100, pp. 074301; (30a) Wang, Z, and Xu, Y., 2007, "Vibration Energy Harvesting Device based on Air-Spaced Piezoelectric Cantilevers" Applied Physics Letter, 90, pp. 263512; (31a) Kim, F L W., Batra, A., Priya, S., Uchino, K., Markley, D., Newnham, R. E., and Hofmann, H. F, 2004, "Energy Harvesting Using a Piezoelectric 'Cymbal' Transducer in Dynamic Environment," Japanese Journal of Applied Physics, 43, pp. 6178-6183; (32a) Chen, C. T., Islam, R. A., and Priya, S., "Electric Energy Generator," IEEE Transactions on Ultrasonics, Ferroelectrics, and Frequency Control, 53(3), pp. 656-661: (33a) Vestas Wind Systems A/S, Wind Turbine Products' Brochures of V52-850 kW and V90-3.0 MW, http://www.vestas.com/ (hereinafter "VESTAS"); (34a) Bryant M., Garcia E. (2009) "Aeroelastic Vibration Power Harvester Design", Dynamics, Systems and Control Seminar Series, Ithaca N.Y., Mar. 27, 2009; (4b) S. P. Beeby, M. J. Tudor, and N. M. White, Meas. Sci. Technol. 17, R175 (2006); (9b) A. Erturk, J. Hoffmann, and D. J. Inman, Appl. Phys. Lett. 94, 254102 (2009); (10b) F. C. Moon and P. J. Holmes, J. Sound Vib. 65, 275 (1979); (11b) Supplementary material at http://dx.doi.org/10.1063/1.3525045 for calculation and experiment details; (12b) C. H. K. Williamson and R. Govardhan, Annu. Rev. Fluid Mech. 36, 413 (2004); (13b) S. Shukla, R. N. Govardhan, and J. H. Arakeria, J. Fluids Struct. 25, 713 (2009); (20b) S. Li and H. Lipson, Proceedings of ASME Conference on Smart Materials, Adaptive Structures and Intelligent Systems (ASME, Oxnard, Calif., 2009), pp. 611-619; (11c) G. W. Taylor, J. R. Bums, S. M. Kammann, W. B. Powers, and T. R. Welsh, IEEE J. Ocean. Eng. 26, 539 (2001); (18c) Measurement Specialties. Inc, Piezo Film Product Guide and Price List, (2008); (35c) M. Bryant and E. Garcia, Proc. SPIE, 7288, 728812 (2009); (36c) R. R. Mahadik and J. Sirohi, Proc. ASME Conference on Smart Materials, Adaptive Structures and Intelligent Systems, (ASME, Oxnard, Calif., 2009), pp. 443-450; (38c) MicroBelt tech sheet, http://www.humdingerwind.com/; (39c) Y. K. Tan and S. K. Panda, Proc. Annu. Conf. IEEE Ind. Electron. Soc. (IEEE, Taipei, 2007), pp. 2175-2180; (40c) W. P. Robbins, I. Marusic, D. Morris, and T. O. Novak, Proc. ASME International Mechanical Engineering Congress and Exposition, (ASME, Chicago, Ill., 2006), pp. 581-590; (41c) H. D. Akaydin, N. Elvin, and Y. Andreopoulos, J. Intell. Mater. Struct. 0, 1 (2010); (41c) H. D. Akaydin, N. Elvin, and Y. Andreopoulos, Exp. Fluids. (2010); (43c) S. Pobering, S. Ebermeyer and N. Schwesinger, Proc. SPIE, 7288, 728807 (2009); (44c) N. S. Hudak and G. G. Amatucci, J. Appl. Phys. 103, 101301 (2008).

Description Of the Related Art Section Disclaimer: To the extent that specific publications are discussed above in this Description of the Related Art Section, these discussions should not be taken as an admission that the discussed publications (for example, published patents) are prior art for patent law purposes. For example, some or all of the discussed publications may not be sufficiently early in time, may not reflect subject matter developed early enough in time, may be work of the present inventors and/or may not be sufficiently enabling so as to amount to prior art for patent law purposes. To the extent that specific publications are discussed above in this Description of the Related Art Section, they are all hereby incorporated by reference into this document in their respective entirety(ies).

BRIEF SUMMARY OF THE INVENTION

For purposes of this document, a cantilever member is an at least semi-rigid member that is at least substantially fixed at one end and at least substantially free to move in at least one degree of freedom at a diametrically opposed opposite end, as well as at portions intermediate the fixed end and the free end. In many cases, a cantilever member will be elongated in a direction between its fixed and free ends, as is a cantilever beam, but this is not always the case. By at least semi-rigid, what is meant is: (i) more rigid than textile fabrics; (ii) sufficiently rigid to be self-supporting (when not under external stresses and/or strains) without substantial pliability or drooping; and (iii) sufficiently rigid to provide some substantial resistance to moment and shear stress. For example, a dry and unbent piece of typical breakfast cereal box cardboard would be semi-rigid, but a piece of standard printer paper would not be at least semi-rigid. There are several modes of cantilever motion possible in three-space. The easiest one to visualize is the cantilever vibration of the type that can be observed when a diver dives from a flexible diving board. Other modes may involve diving board type vibration in shifting planes (instead of in a constant plane, like a diving board). Still other modes may involve twisting, such as twisting about an axis parallel to a direction of elongation of an elongated cantilever member.

According to one aspect of the present invention, a wind harvesting device includes a first cantilever stalk member that is fixed to a frame so that is will undergo cantilever type motion when placed in an ambient fluid current (such as the wind). The stalk member includes piezoelectric type material (see DEFINITIONS section) that is structured so that cantilever motion of the cantilever stalk member will be transduced into electricity. A set of terminals is electrically connected to the cantilever stalk member so that the electricity can be harvested and used. In some embodiments the device will further include a pendular member that is mechanically connected to the stalk member. In some embodiments, the pendular member will be rotationally mechanically connected to cantilever stalk member by a hinge. In some embodiments, the pendular member is connected in vicinity of the free end of the cantilever stalk member. In some embodiments: (i) the cantilever stalk member is elongated; and (ii) the pendular member is connected in the vicinity of the free end in a direction substantially non-parallel to the direction of elongation of the cantilever stalk member.

One aspect of the present invention involves investigation of the principles and feasibility of the harvesting energy from the wind in constrained spaces, such as around buildings, as an alternative to conventional rotary wind turbines. Some embodiments involve the idea of harvesting energy from wind induced vibration instead of wind driven rotation. Some embodiments are a tree-like generator for wind energy harvesting including multiple vibrating elements. Some embodiments include a "piezo stalk and leaf" as an element of a plant-like generator. In some embodiments, a leaf, made at least in part from piezoelectric type materials (see DEFINITIONS section), is capable of generating electrical power through wind induced vibrations. It may be possible to use other types of fluid motion to induce the vibration, such as currents in bodies of water.

Another aspect of the present invention is directed to a wind harvesting device that includes a frame, an elongated stalk and a pendular member. In these embodiments, the stalk may be, but is not necessarily, a cantilever member. The frame and pendular member are mechanically connected to the stalk so that the frame is connected at one end of the stalk (with "end" here being determined by the direction of elongation of the stalk member) and with the pendular member being connected in the vicinity of the opposite end. The pendular member is shaped and connected to the elongated stalk so that it extends from the stalk in a direction substantially different than the direction of elongation of the stalk (for example, perpendicular to the direction of elongation of the stalk or at an angle to the direction of elongation of the stalk).

Various embodiments of the present invention may exhibit one or more of the following objects, features and/or advantages:

(1) Light, scalable, robust structure;
(2) Low cost;
(3) Attractive bio-compatible design;
(4) Easy installation, operation and maintenance;
(5) Reconfigurable morphology;
(6) Usability in a wide range of environments;
(7) Broad response band to wind speeds and directions; and/or
(8) Improved electrical energy yield as compared to prior art piezoelectric tree wind harvester assembly designs.

According to an aspect of the present invention, a device includes: a frame; a stalk member; and a set of electrical terminal(s). The stalk member is at least substantially fixedly mechanically connected to the frame. The stalk member includes a piezoelectric type material portion. The stalk member is sized, shaped, connected, structured; located and/or has an appropriate degree of rigidity so that it will exhibit at least a first mode of cantilever motion when the device is placed in a fluid stream with the fluid stream having a first direction and the stalk member having a first orientation with respect to the fluid stream. The piezoelectric type material portion is located so that the first mode of cantilever motion of the stalk will be transduced by the piezoelectric type material portion into transduced electrical energy. The set of electrical terminal(s) is electrically connected to the stalk so that the transduced electrical energy is communicated to the first set of electrical terminals.

According to a further aspect of the present invention, a device includes: a frame; an elongated stalk member (defining a direction of elongation, a first end and second end); a pendular member; and a set of electrical terminal(s). The stalk member is at least substantially fixedly mechanically connected to the frame at its first end so that it extends away from its fixed connection to the frame in a stalk-extension direction that is at least approximately parallel to the direction of elongation. The stalk member includes piezoelectric type material. The stalk member is sized, shaped, connected, structured and/or located so that it will exhibit a fluttering motion when the device is placed in a fluid stream with the fluid stream having a first direction and the stalk member having a first orientation with respect to the fluid stream. The piezoelectric type material is located so that the fluttering motion of the stalk member will be transduced into transduced electrical energy. The set of electrical terminal(s) is electrically connected to the stalk so that the transduced electrical energy is communicated to the first set of electrical terminals. The pendular member is mechanically connected to the stalk member in the vicinity of its second end and extends from the stalk member in a direction that is at least substantially non-parallel to the direction of elongation.

According to a further aspect of the present invention, a device includes: a frame; an elongated stalk member; a pendular member; a hinge defining at least a first axis or rotation; and a set of electrical terminal(s). The stalk member is at least substantially fixedly mechanically connected to the frame. The stalk member includes a piezoelectric type material portion. The stalk member is sized, shaped, connected, structured and/or located so that it will exhibit a fluttering motion when the device is placed in a fluid stream with the fluid stream having a first direction and the stalk member having a first orientation with respect to the fluid stream. The piezoelectric type material portion is located so that the fluttering motion of the stalk member will be transduced into transduced electrical energy. The set of electrical terminal(s) is electrically connected to the stalk so that the transduced electrical energy is communicated to the first set of electrical terminals. The pendular member is rotatably mechanically connected to the stalk member by the hinge so that the pendular member may rotate with respect to the stalk member about at least the first axis of rotation.

BRIEF DESCRIPTION OF THE DRAWINGS

The present invention will be more fully understood and appreciated by reading the following Detailed Description in conjunction with the accompanying drawings, in which:

FIG. 22 is a graph of performance data appertaining to the present invention;

FIG. 23 is a transverse, cross-sectional view of a first laminate design for a piezoelectric type material cantilever stalk for use in devices according to present invention; and FIG. 24 is a transverse, cross-sectional view of a first laminate design for a piezoelectric type material cantilever stalk for use in devices according to present invention.

DETAILED DESCRIPTION OF THE INVENTION

Figure 1A:
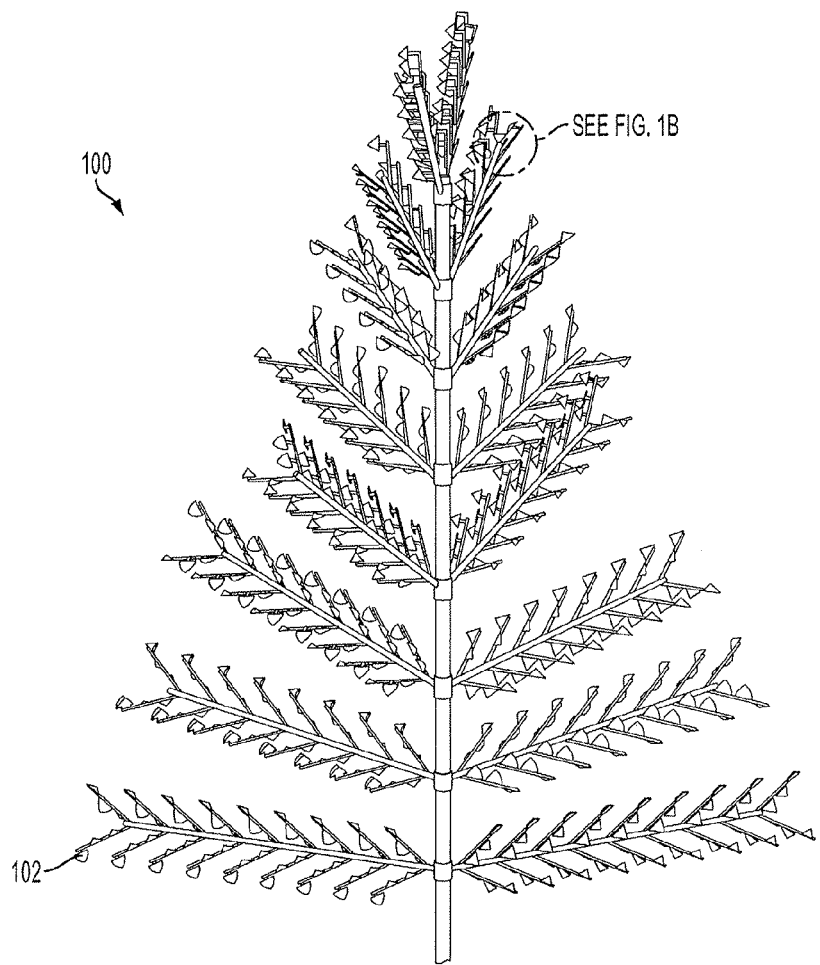
FIG. 1A is a perspective view of a first embodiment of a wind harvesting device according to the present invention.
Figure 1B:
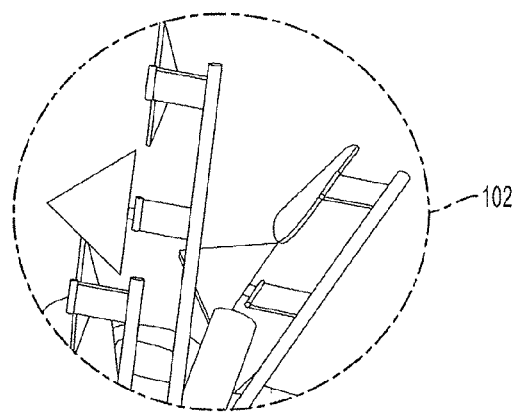
FIG. 1B is a perspective view of a portion of the first embodiment device.
Figure 2:
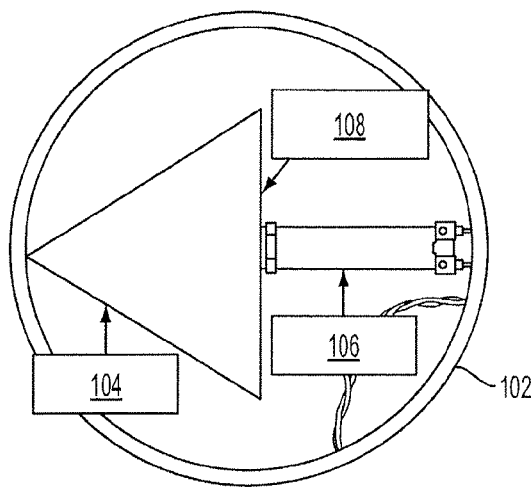
FIG. 2 is an orthographic front view of a portion of the first embodiment device.

FIGS. 1 and 2 show wind harvesting device 100. In device 100, each vibrating element 102 consists of a polarized PVDF cantilever stalk 106; a plastic hinge 108 and a polymer/plastic leaf member 104. When the wind blows, stalk 106 exhibits a cantilever motion that causes stresses and strains in its piezoelectric type material, especially at or near its major surfaces. These strains are transduced into AC electrical energy which is communicated away from the stalk by conduction paths, and then aggregated with electricity from other piezoelectric material type stalks of the device. In this way, the set of vibrating elements 102 of device 100 can be used as an energy source for charging batteries, providing utility power to a grid and so on.

In this embodiment the leaf is plastic but it may be made out of paper or paperboard. Pendular (or leaf) member 104 is also moved by the force of the fluid current of the wind and will help drive the cantilever motion of cantilever stalk 106. In this embodiment, leaf member 104 is not made of piezoelectric material, and may not be subject to very much internal stresses or strains because it may move in many degrees of freedom and is not mechanically constrained in many degrees of freedom. leaf 104 may be made to be substantially more rigid than the cantilever stalk that suspends it. In some embodiments the leaf is not pliable and not a textile and is semi-rigid (or rigid) like a cantilever member. In these embodiments, the material of the pendular member must be made sufficiently thick to attain the desired degree of rigidity. The leaf will transmit forces to the stalk through hinge 108. These forces will help drive the stalk into at least one mode of cantilever motion in a way somewhat similar to the way a pendular mass/weight in a pendulum assembly will transmit forces on the string or rod that holds it against the forces of gravity and inertia. Pendular members in the present invention, on the other hand, transmit forces induced by fluid currents and inertia, and they transmit these forces to a cantilever stalk, rather than a pliable string or an ideally rigid rod. In some embodiments of the present invention, the stalk is generally flat and planar stalk and the pendular member is also generally flat and planar.

In some embodiments, the stalk member may not be generally planar or flat, but it should be structured so that it will exhibit at least one mode of cantilever motion when placed in an ambient fluid current. One example would be the use of a flat stalk member with curved and/or bent major surfaces. Another (not necessarily currently preferred) example of this kind of structure would be an elongated, cylindrical piezoelectric stalk mechanically connected on one end to a frame and having a flat, generally planar pendular member mechanically connected (e.g., rigidly mechanically connected, rotationally mechanically connected) at its other end. In this example, the stalk member would need to be made sufficiently long, slender and flexible so that the force of the fluid current on a leaf would cause the stalk to exhibit cantilever motion.

In some (not necessarily currently preferred) embodiments there may not be a pendular member at all. For example, even without any sort of pendular member affixed to its free end, a flat, generally planar and unitary piezoelectric type material stalk member may have enough effective area, length and/or intermediate degree of rigidity/flexibility to exhibit cantilever motion with one end substantially fixed and the other end substantially free.

In some (not necessarily currently preferred) embodiments the pendular member may not be generally flat and planar. For example, the pendular member may be flat, but with curved and/or bent major surfaces. As a further example, the pendular member could take on more complex three dimensional shapes, such as the shape of a pinwheel or a windsock.

In vibrating element 102, hinge 108 rotatably mechanically connects leaf 104 to stalk 106. While this hinge has interleaved hinge knuckles disposed over opposing "hinge leaves" (like the hinges typically found on doors inside of people's homes), other hinge designs (now known or to be developed in the future) may be used, such as a living hinge. More specifically, the pendular member can rotate with respect to the free end of the cantilever stalk about an axis that is parallel to the plane of the stalk in the vicinity of its free end and also parallel to the plane of the flat, generally planar pendular member. In simpler terms, the leaf is free to rotate with respect to the free end of the stalk through some range of angular motion like a gate swinging on a gate post, with one degree of freedom of relative movement. This is not necessarily the only way to mechanically connect a pendular member to the free end of a cantilever stalk member according to the present invention. For example, there may be a rigid mechanical connection between pendular member and the cantilever stalk member. In other embodiments there may be more than one degree of freedom of movement at the mechanical connection between the stalk member and the pendular member.

Stalk 106 is elongated, and it is elongated in a direction that is generally perpendicular from the bluff body to which it is fixed at its fixed end. However, other embodiments may have elongated stalks that extend at other angles with respect to the surfaces of the bodies to which they are fixed at their fixed ends. Still other embodiments may not have elongated stalks at all, or stalks that are elongated, but in a direction substantially parallel to the surfaces of the bluff bodies to which they are fixed at their fixed ends. It is noted that the term "ends" here is not necessarily determined with respect by the direction of elongation of the stalk, but rather by the cantilever motion of the cantilever stalk. The mode and pattern of cantilever motion of the stalk will generally be determined by: (i) the way the stalk is mechanically connected to the frame at its fixed end; (ii) the geometry of the cantilever stalk member; (iii) the geometry and location of connected pendular member(s) (if any); (iv) the rigidity/flexibility and other characteristics of the material(s) making up the cantilever stalk member; (v) the direction, speed and/or turbulence of the fluid stream into which the vibrating element is placed and/or (vi) the fluid characteristics of the fluid making up the fluid stream.

Vibrating element 102 has a stalk with a single pendular member attached to it. As mentioned above, some embodiments may have zero pendular members attached to them. In other embodiments there may be multiple pendular members attached to a single stalk. In still other embodiments, a singe pendular member may be mechanically connected to more than one stalk. These variations can affect the mode of cantilever motion of the stalk as well as the vibrational patterns (for example, vibrational wavelengths) exhibited for a given stalk in a given mode of induced cantilever motion.

Figure 3:
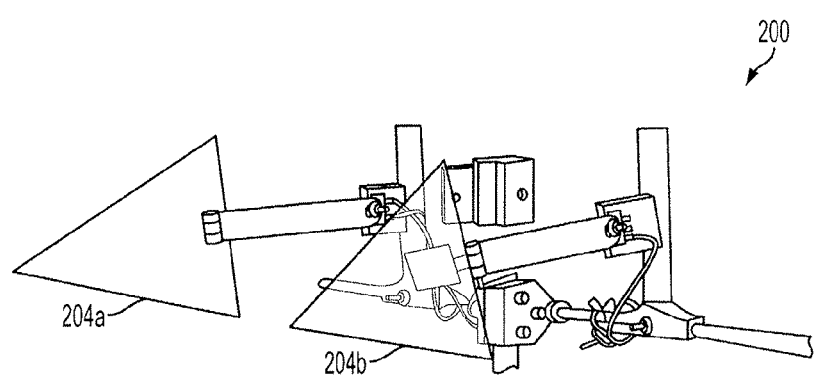
FIG. 3 is a perspective view of a portion of a second embodiment of a wind harvesting device according to the present invention.

FIG. 3 shows a portion of a five leaf wind harvesting device 200 including first leaf member 204a and second leaf member 204b. Device 200 is generally similar to device 100 except: device 200 has actually been constructed as a prototype and device 200 has only five leaves. Device 200 shows a horizontal leaf stalk design, which is considered to be "horizontal" because the leaf is mechanically connected to the stalk in the vicinity of its free end so that it extends from the stalk at least substantially in the direction of the cantilever. It is further noted that the leaf is triangular in shape, but other leaf shapes maybe possible. It is further noted that the stem is generally rectangular, flat, planar and elongated in the cantilever direction. It is noted that the stem is narrower than the base of the leaf (where the leaf is joined to the stem by a hinge), but in some embodiments the stalk may be as wide or wider than the base of the leaf.

Some nomenclature will now be defined: (i) Po is Mean output power; (ii) Vrms is Root mean square of output voltage; (iii) R is Internal resistance of oscilloscope; (iv) Ro is Optimized matching resistance; (v) f is Vibration frequency; and (vi) C is Capacitance of piezoelectric element.

When a fluid passes a bluff body, such as the branch of a tree, it will alternately produce a vortex shedding on both sides of bluff body, leading to a classical "vortex street" configuration in the near wake. The fluctuating pressure forces then form in a direction transverse to the flow and may cause structural vibrations. This kind of mechanical vibration energy which we can be converted to electrical power. In some embodiments of the invention, it is wind currents that vibrate the piezoelectric type materials to produce electricity, but other embodiments of the present invention may use other fluid currents, such as currents in bodies of water, convective air currents caused by industrial processes and/or forced air currents caused by industrial processes.

Figure 4:
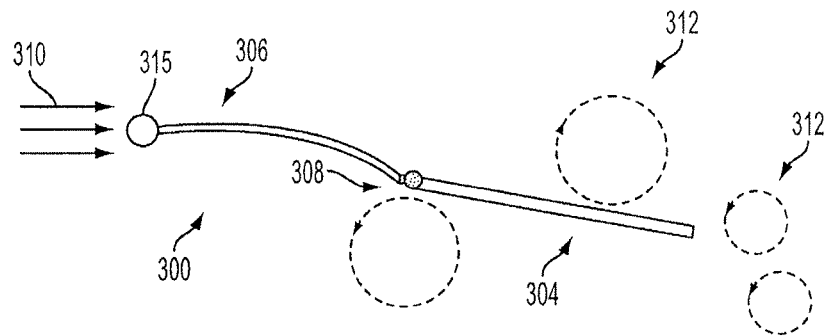
FIG. 4 is a top view of a portion of a third embodiment of a wind harvesting device according to the present invention.

A Simplified Dynamic System Model will now be discussed in connection with FIG. 4. FIG. 4 shows a top orthographic view of a vibrating system 300, including wind 310; cantilevered piezoelectric type material stalk member 306; hinge 308; leaf (or pendulum) member 304; and vortices 312. To understand the physical mechanism behind the design, we consider a simplified model of the flapping fluid-structure coupled system which is abstractly treated as an aerodynamic instability driven cantilever-pendulum system 300. The attachment "leaf" 304 is driven by the vortex induced periodic pressure 312 through the bending force and moment of the stalk 306. System 300 is another example of a horizontal-stalk leaf because branch (or bluff body) 315 and leaf 304 are respectively connected to stalk 306 at opposite ends of stalk 306.

Some theoretical underpinnings will now be discussed. In assembly 200 and system 300, the flexible plate (that is, the leaf) and film (that is, the stalk) are driven to oscillate in at least one mode of cantilever motion (for example, in a diving board mode of cantilever motion in a single plane). The cantilever motion is attributed to instability of the aero-elastic system. There are two potential excitations that may be responsible for the unstably periodic motion of a semi-rigid body. First is the external harmonic forcing field caused by vortex shedding from leading edge (bluff body). Second is the unsteady force and moment induced by the vortex when shedding from the trailing edge of the flexible plate or film, which is called a self-induced effect. Classical studies predict that the dominant exciter of this oscillation phenomenon should be the vortex shedding from the bluff body. It is currently believed that it is still an open question as to whether the cantilever motion effect is caused more by shedding at the bluff body or shedding from the trailing edge. It is suspected that both types of vortex shedding may significantly help cause the cantilever motion.

If we assume both of these types of vortex shedding can be represented as simple harmonic excitations, then the system dynamic model can be simplified to a harmonic excitation cantilever-pendulum system. This system is similar to the physical model of a nonlinear vibration absorber which has been studied in other contexts. The pendulum (that is, the leaf) could be modeled as an absorber of vibration energy by reducing oscillation amplitude of cantilever when the autoparametric condition is satisfied. Instead, we prefer to model the pendulum as a cantilevered vibration amplifier. Some embodiments of the present invention might be helpfully designed with the opposite parametric condition in order to produce a large-amplitude vibration on the PVDF stalk with low-amplitude, high-frequency excitation.

Design and implementation issues will now be discussed, such as basic design and experimental solutions. Considering of the unpredictable wind strength, the flexible and robust piezoelectric materials (PVDF) may be chosen to make the stem, or part of the stem, as the component of the wind harvesting device that transduces fluid currents into electrical energy. Besides the horizontal design discussed above, another design will herein be called an "angled design" (or, when the angle is 90 degrees, a "vertical design"). In the angled design, one end of the piezo-electric type material stem is mechanically connected to the bluff body and the end opposite the mechanical connection to the bluff body remains free of mechanical connections. When the wind crosses this angled design device, it will lead the aero-elastic instability and the periodic pressure difference will drive the piezo-stalk to bend in the downstream of the air wake, synchronously. In this way, an AC signal can be collected from the flapping piezo-stalk. More specifically, the periodic bending of the leaf and stem sub-assembly causes stresses and strains in the piezoelectric type material in the stem, which, in turn, transduces the electrical energy that forms the AC signal. The electrical energy of this AC signal is: (i) rectified with a full-wave bridge (not shown); and (ii) stored in a capacitor (not shown).

A series of experiments was conducted in a small wind tunnel using three different types of design for the vibrating element: (i) a cantilever-stalk-only design; (ii) a horizontal-cantilever-stalk-leaf design (this is similar to the vibrating elements of devices 100, 200 and 300 discussed above); and (iii) a vertical-cantilever-stalk-leaf design. These experiments on these three vibrating element designs were conducted in a small wind tunnel (cross-section: 25×25 centimeters; Wind speed less than or equal to 15 meter per second (m/s), experimental range: 2-8 m/s). Wind speed was measured using a small digital wind meter (WindMate 200;

Speedtech Instruments). The output voltage was measured simultaneously with probes of two digital oscilloscopes: (i) model TDS3024B, Tektronix, with 1×, resistance: 1 mega-ohm; and (ii) model DSO6014A, Agilent Technologies, with 10×, resistance: 10 mega-ohms. (Note: the term(s) "Tektronix," "WindMate 200," "Speedtech Instruments," and/or "Agilent Technologies" may be subject to trademark rights in various jurisdictions throughout the world and are used here only in reference to the products or services properly denominated by the marks to the extent that such trademark rights may exist.)

Figure 5:
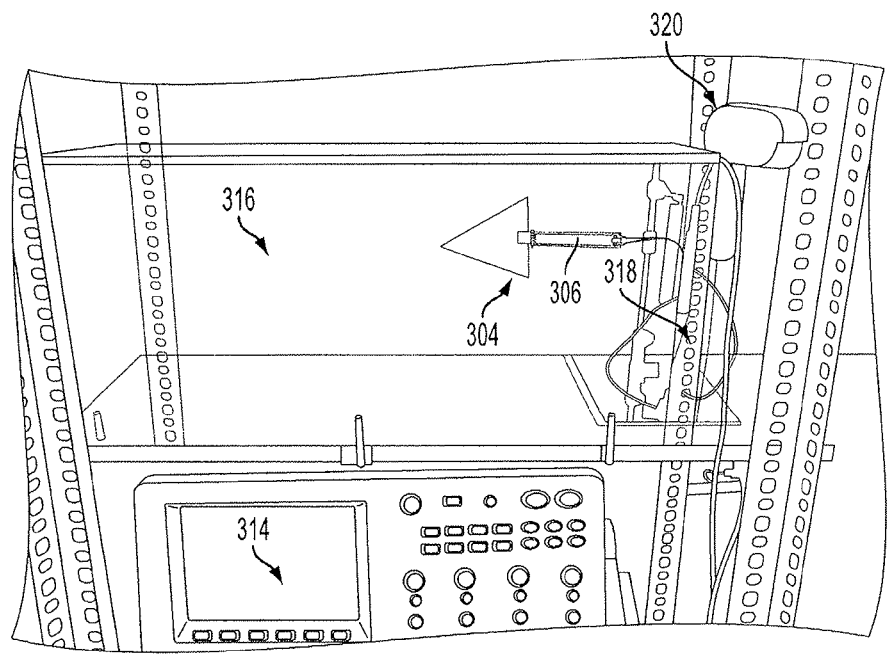
FIG. 5 is a perspective view of a first embodiment of a wind tunnel testing station and a portion of the third embodiment device as it undergoes performance testing.

FIG. 5 shows a wind tunnel apparatus being used to measure the performance wind harvesting assemblies according to the present invention. The wind tunnel experimental apparatus includes: digital oscilloscope 314; probe 318; wind tunnel assembly 316 and digital wind meter 320. The Root Mean Square (RMS) of voltage Vrms is measured during about 5 seconds on the load resistance R. The average output power Po is calculated using the following formula: Po= $(Vrms)^2/R$.

The testing of the cantilever-stalk-only design will now be discussed. This design (sometimes herein called the "Original Design") is not shown in the Figures, but has a vibrating element design similar vibrating element 102 (discussed above) with its pendular (or leaf) member and hinge removed. The Original Design test device was fabricated from the following components: (i) half circular cylinder (length: 10 cm; diameter: 2 cm) for the bluff body using ABS on a 3D-printer (Dimension SST 768 by CADimensions, Inc); and (ii) 28 micro-meter PVDF stalk. (Note: the term(s) "CADimensions" and/or "Dimension SST 768" may be subject to trademark rights in various jurisdictions throughout the world and are used here only in reference to the products or services properly denominated by the marks to the extent that such trademark rights may exist.) In the Original Design test device, the cantilever stalk is generally flat, semi-rigid, generally planar; rectangular and elongated in the cantilever direction. More specifically the stalk was a PVDF DT-028K/L (with rivets) stalk having the following dimensions: 73 millimeters (mm) cantilever length×16 mm width× 40 micro-meters thickness. The fixed end of cantilever stalk was mechanically connected to a bluff body frame by rivets. The bluff body was secured so that its direction of elongation was perpendicular to the direction of the flow of the wind in the wind tunnel. The cantilever direction the stalk was parallel to the direction of the wind flow and the cantilever stalk was aligned with the bluff body and located behind it with respect to the wind flow. The Original Design vibrating element only output a relatively small amount of electrical energy, specifically a power level is only a few pW (that is, $10^{-9}$ watts), using a 2 cm diameter circular cylinder as the bluff body in 5 m/s wind. This level of power is unable to drive even a common LED.

The testing of the horizontal-cantilever-stalk-leaf design will now be discussed. This is the design shown in the testing station in FIG. 5. In this improved design, the neutral axis is within the lamination instead of being within the PVDF material, which means that the PVDF film of the stalk is strained to a greater extent during cantilever vibrational motions of the stalk. In the improved horizontal-cantilever-stalk-leaf design, the PVDF stalk was modified to be a laminated PVDF element. More specifically, two variations of the horizontal-cantilever-stalk-leaf design were tested, using stalks as follows: (i) LDT1-028K/L with rivets 41 mm×16 mm×205 micro-meters; and (ii) LDT2-028K/L with rivets, 72 mm×16 mm×205 micro-meter. These laminated design stalks were intended to, and did in fact, achieve higher output power. These stalk designs had one layer of PVDF film and a non-piezoelectric type material layer bonded into a single, flat, generally planar, rectangular laminate. Alternatively, such a laminate structure could have multiple layers of piezoelectric type material alternated with layers on non-piezoelectric type material in order to transducer greater amounts of electricity from a given amount of cantilever motion of a single stalk. However, multiple layers make for a stiffer stalk which will generally be more difficult to drive into motion. In designing the stalk, the designer should take into account expected fluid streams speeds and turbulence when balancing the amount of material to use against the desired degree of flexibility/rigidity of the cantilever stalk.

Figure 6:
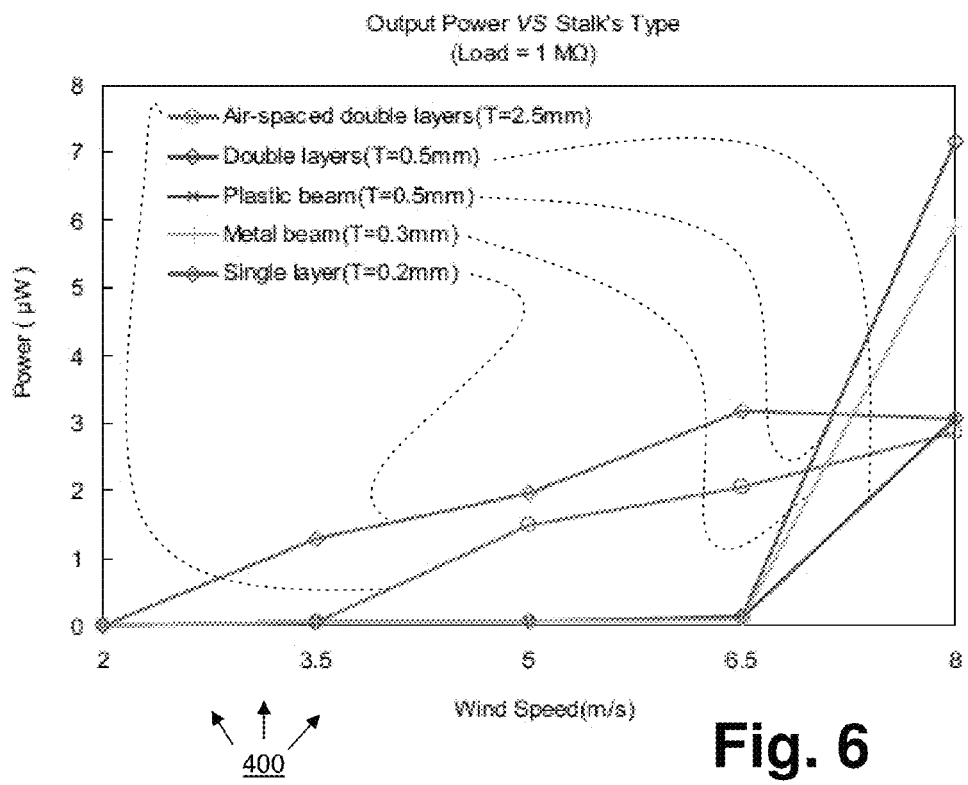
FIG. 6 is a graph of performance data appertaining to the present invention.

After some tests that involved adhering plastic beam (acrylic sheet, thickness: 0.5 mm) as the non-piezoelectric layer of the stalk, metal beam (1095 steel sheet, thickness: 0.3 mm) as the piezoelectric layer of the stalk and two kinds of double-layer stalks, it was determined that an air-spaced double layer configuration appears to be the best solution, and a prototype using this stalk design in a horizontal-cantilever-stalk-leaf vibrating element design was made. The results of testing the various kinds of stalk laminate geometries is shown at graph 400 of FIG. 6.

Figure 7:
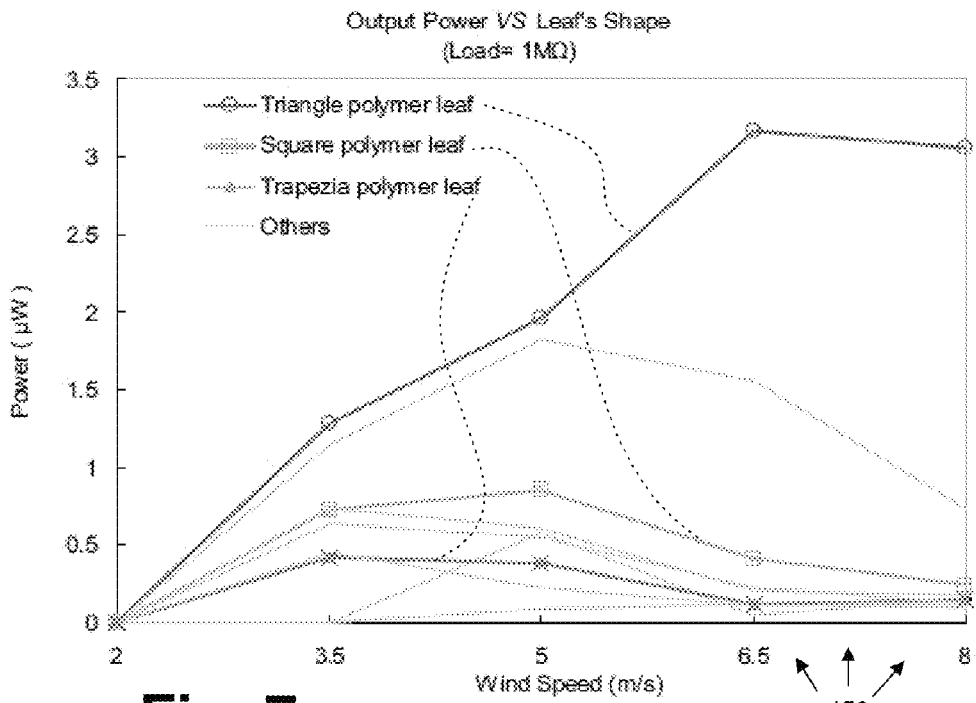
FIG. 7 is a graph of performance data appertaining to the present invention.

The size and/or shape of the leaf may also be changed. The performance of various leaf shapes at various wind speeds is shown at graph 450 of FIG. 7. One tested leaf shape was an isosceles triangle shape polymer attachment (hemline: 8 centimeters (cm), height: 8 cm, area: 32 cm$^2$).

In the improved horizontal-cantilever-stalk-leaf-stalk vibrating element design, a custom fabricated pair of small ABS hinges was used to rotationally mechanically connect the leaf to the end of the laminated stalk so that the axis of rotation of the hinge is parallel with and aligned with the plane of the flat leaf and the plane of the flat stalk.

In testing, an interesting phenomenon was encountered whereby the horizontal-stalk leaf could exhibit large amplitude flapping dramatically as a result of increased vibrating amplitude. In this situation, the output voltage was several times higher than the Original Design, which did not include any sort of pendular member (or leaf).

Figure 8:
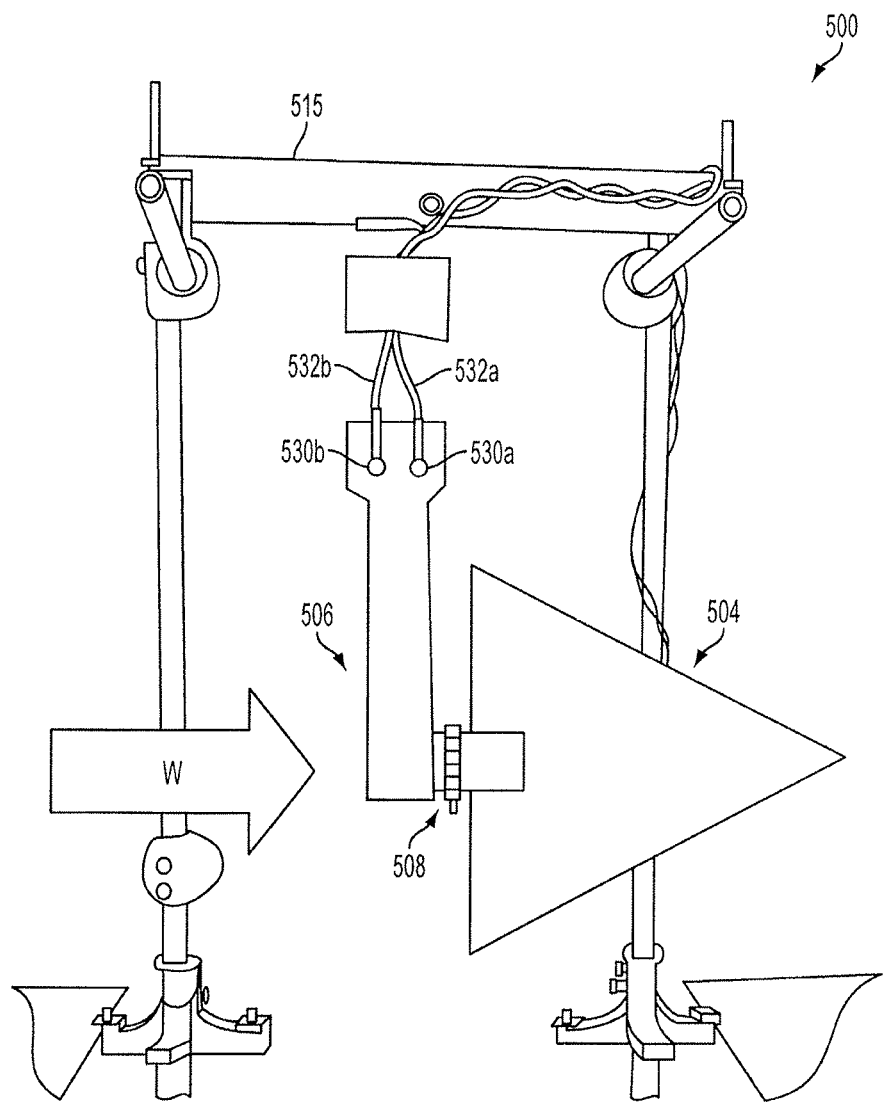
FIG. 8 is a fourth embodiment of a wind harvesting device according to the present invention.

The testing of the vertical-cantilever-stalk-leaf design will now be discussed. An embodiment of the vertical-cantilever-stalk-leaf design is shown in FIG. 8 in testing assembly 500. Testing assembly 500 includes: pendular member 504; cantilever stalk 506; hinge 508; frame 515; electrical connections 530a,b; and terminals 532a,b.

As shown in FIG. 8, the frame of this embodiment does not include any sort of bluff body interposed between the incoming wind flow W and the stalk and pendular member. As further shown in FIG. 8, when the pendular member is mounted perpendicular to the cantilever direction and/or elongation direction of the stalk, it may be preferable to orient the stalk so that it is oriented vertically with respect to the wind and perpendicular to fluid flow direction W. As noted above, the horizontal vibrating element configuration was mounted so that the stalk was horizontal and parallel to the fluid flow direction. However, it may be possible to mount "vertical" vibrating elements horizontally (or at an angle) and to mount "horizontal" vibrating configurations vertically. It is also noted that angled vibrating configurations (not shown) can be mounted at any orientation with respect to the gravitational field and/or wind direction, but they may work better at some orientations than other. Generally speaking, the designer's goal will be to mount the various leaves so that they generate as much electrical power as possible over the long run.

In assembly 500, the stalk is again a laminated PVDF element (LDT2-028K/L w/rivets) and is fixed at one end (in this case its top end). Once again, the pendular member is triangular, generally flat and generally planar in shape. Again, the pendular member attaches in the vicinity of the free end of the cantilever member, but in this embodiment it extends from a side edge of the stalk, rather than extending from the end. Once again, the pendular member is rotationally mechanically connected to the stalk through a plastic hinge. The direction of the leaf is no longer the same as stalk, but it is still in the direction of the airflow, thus the new device looks more like an "L" shape. In this vertical configuration, the stalk will exhibit two modes of cantilevered motion as follows: (i) twisting; and (ii) bending in a single plane (also called diving board type cantilever motion). While stalk 506 has appropriate rigid/flexible, size, shape and connection characteristics to exhibit cantilever motion, some vertical-stalk-leaf configurations of the present invention may not exhibit cantilever motion. For example, the stalk may be pliable so that its fluttering motion is not cantilever motion.

Figure 9:
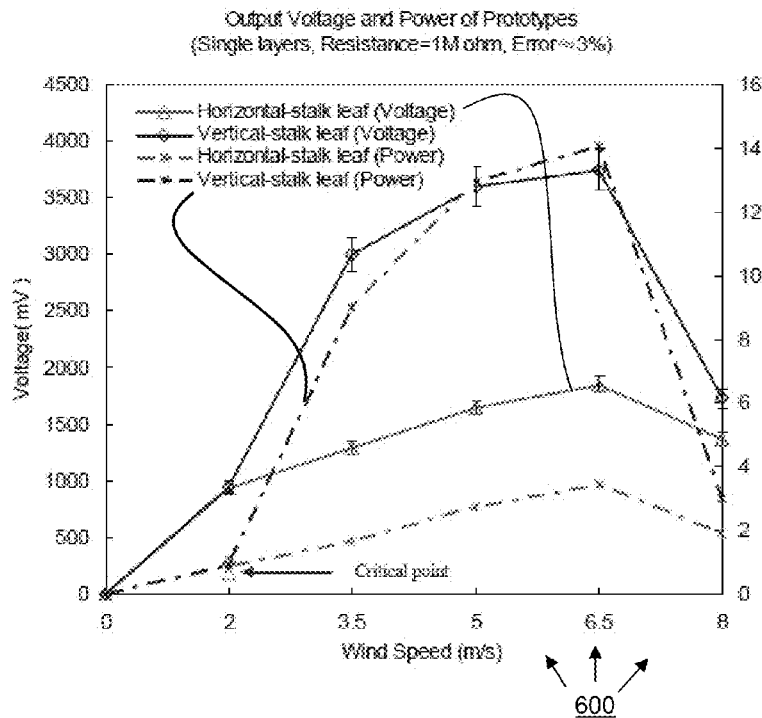
FIG. 9 is a graph of performance data appertaining to the present invention.
Figure 10:
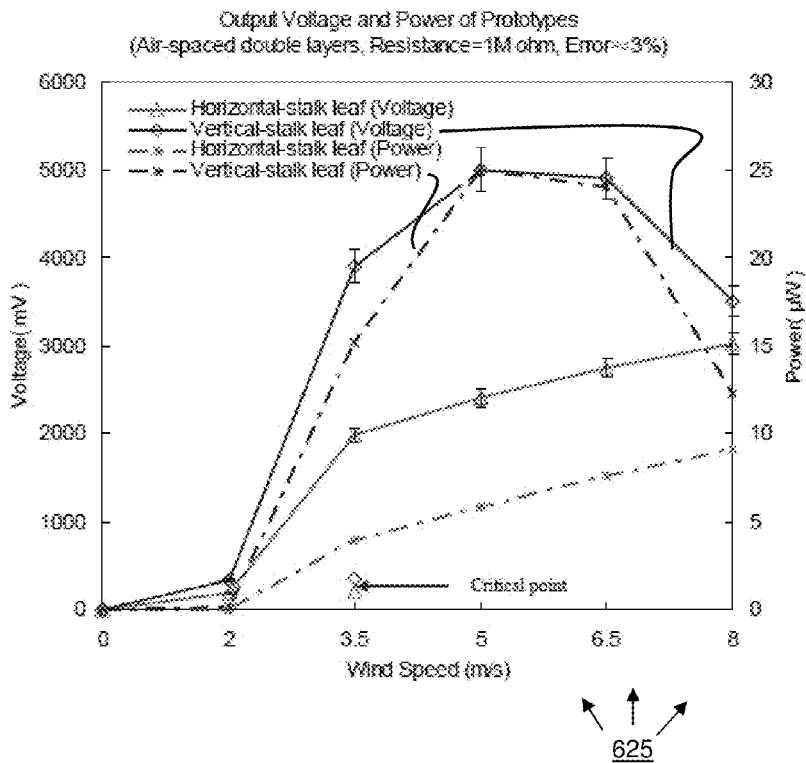
FIG. 10 is a graph of performance data appertaining to the present invention.

The output voltage/power of various vibrating element designs will now be discussed. Graphs 600 and 625, of FIGS. 9 and 10 respectively, show that there exists a response region of wind speed between 0-8 m/s at which both devices could reach a peak value of output voltage/power. However, the trend of output values are also found to decrease as the wind speed increases above the peak value speed. This might indicate that the leaves' flapping frequencies could approach the first natural frequency of the PVDF stalk during this low wind speed range. Thus, we can conclude that both systems will get other peak values of output voltage/power in a higher wind speed range again. Further, the bi-stable response could be observed from the plots 600 and 625. There exists one critical speed point and region (single layer device: begins around 2 m/s; double layers device: begins around 3.5 m/s.), during these regions, the coupled systems keep either flat reposing (might be infinitesimal-amplitude, high-frequency oscillating) or periodically large-amplitude oscillating. Furthermore, if the wind speed is higher than the critical speed, the leaf will flap, but if it is lower, the flapping will stop. Over this region (wind speed greater than or equal to 6.5 m/s), a chaotic oscillation will appear occasionally. This is called a classical fluids-induced bi-stable and chaotic phenomenon.

Figure 11:
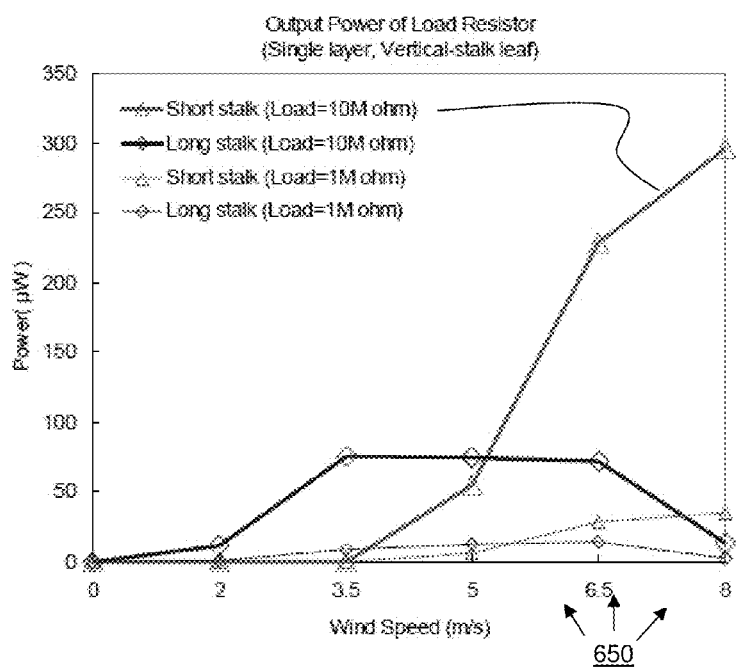
FIG. 11 is a graph of performance data appertaining to the present invention.

The vertical-stalk leaves exhibit much more excitation performance than horizontal-stalk leaves during all experiments. Based on these results, we can conclude that the vertical-stalk configuration of leaf probably has more potential for wind vibration devices. From graphs 600 and 625, we could easily find the difference between single layer and double layers, both two layers devices produce much higher voltage than the single layer device, however, along with a narrowed wind speed response band, they need a higher wind speed to get into large-amplitude oscillation (output voltage greater than or equal to 500 milli-volts (mV)). As demonstrated before in graph 400, air-spaced double layers could offer a good trade-off solution between increased strain and added stiffness of multiple layers stalk. Previous research suggested an optimized matching resistance for output power of piezoelectric based vibration generator, Ro, by neglecting of the dielectric loss factor and damping, it could be approximately given as Equation (2): $Ro=1/(2\pi fC)$, where f is the frequency of vibration, and C is the capacitance of piezoelectric element. For the PVDF stalk of our device, the capacitance of a long PVDF stalk is 2.78 nano-Farads (nF) (for the LDT2-028K/L with rivets design stalk), and of a short stalk is 1.38 nF (for the LDT1-028K/L with rivets design stalk). Wind-induced vibration frequencies are both around 3-10 Hz (2-8 m/s), so the optimized load should be around 6-19 mega-ohms and 12-38 mega-ohms, respectively. Our experimental data validates this by measurement on 1 mega-ohms and 10 mega-ohms internal resistances of the digital oscilloscopes, as shown in graph 650 of FIG. 11.

Figure 12:
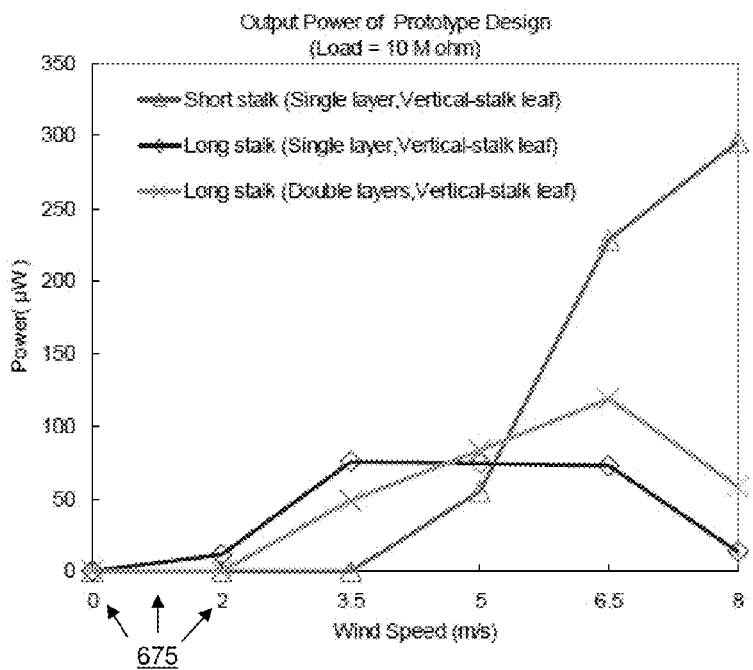
FIG. 12 is a graph of performance data appertaining to the present invention.

The 10 mega-ohms load shows a higher output level of power because it is much closer to the optimized load value than 1 mega-ohms. We compared the output power of our prototypes in graph 675 of FIG. 12. The results reveal that using a short PVDF stalk could get much more output power in the specific wind speed region (6.5-8 m/s). We observed the maximum output value 296 micro-watts at 8 m/s wind during our experiments, however, the response band of the short stalk was more limited, as it was able to oscillate at large-amplitude only when wind speeds reached beyond 3.5 m/s. This phenomenon might be attributed to the decrease in external bending moment caused by the shorter element.

Some conclusions of research in connection with the present invention will now be discussed. First, we observed the maximum output power (~300 micro-watts (μW), 10 mega-ohms load) in 8 m/s wind from a single layer vertical-stalk leaf with a short PVDF stalk. The power density approached the peak value: power per device's volume ~300 $\mu W/cm^3$ and power per device's weight ~80 μW/g. The electrical performance of devices according to the present invention have been found to be better than previous piezoelectric wind energy harvesters such as the one disclosed in Priya Small Scale Windmill. Also, we must note that we have not tried to use theoretically optimized value (refer to Equation 2) of the load resistor during our experiments, which could allow for even higher levels of output power. As a simple validation, the output power on 1 mega-ohms and 10 mega-ohms loads tested herein would seem to suggest that the load resistor value may be further optimized as will be appreciated by those of skill in the art.

Second, the trade-off between increased strain and added stiffness of PVDF stalk was studied by comparing the experimental results of single layer and air-spaced double layers devices. We observe the bi-stable response of the flapping piezo-leaf in our experiment, and then the critical point and region are shown in FIGS. 9 to 12. Furthermore, combining the assumption of a simplified system model and our experimental analyses, we can explain and discuss the dramatically increasing output voltage of horizontal-stalk and vertical-stalk leaf prototype devices for the following two possible reasons: (i) The attached leaf, like a "sail", could capture much more wind induced force and impact than only a PVDF stalk; and (ii) the attachments and hinge could induce the changes of mass distribution and system natural frequency. Possibly, the system natural frequency and subsystem natural frequency approach a region which may amplify the vibration on PVDF stalk.

Finally, we can compared our device and previous piezo-based wind energy harvesters (such as that disclosed in Priya Modeling") and with the large commercial wind turbines such as those disclosed in VESTAS. This rough comparison focuses on the power density as power per weight of main components (piezoelectric materials of harvesters, rotor and blades of wind turbine). In making this comparison, it was found that devices according to the present invention have a significantly higher efficiency than at least some previous piezo-based devices, although the power density of the prototypes of the present invention are not yet as that of commercial wind turbines, such as those disclosed in VESTAS.

Some experimentally obtained maximum power outputs will now be discussed. For a horizontal vibrating element (with direction of cantilever oriented horizontally), 17 micro-watts was obtained using a single layer PVDF stalk with a 10 mega-ohm load and a wind speed of 6.5 m/s. For a vertical vibrating element (with direction of cantilever oriented vertically), 296 micro-watts was obtained using a relatively short, single layer PVDF stalk with a 10 mega-ohm load and a wind speed of 8 m/s. For a vertical vibrating element (with direction of cantilever oriented vertically), 76 micro-watts was obtained using a relatively long, single layer PVDF stalk with a 10 mega-ohm load and a wind speed of 3.5 m/s. For a vertical vibrating element (with the direction of cantilever oriented vertically), 119 micro-watts was obtained using a double layer PVDF stalk with a 10 mega-ohm load and a wind speed of 6.5 m/s. This data seems to suggest that vertical vibrating elements, oriented vertically, may generally have higher power output than horizontal vibrating elements, oriented horizontally.

A potential advantage of parallel wind-vibration energy harvesting appears to be in its robust, simple and maintenance-free monolithic construction, their ability to scale from miniature sizes to large scales through parallelization, and their natural blending in urban and natural environments.

Some embodiments of the present invention are directed to a bio-inspired piezo-leaf architecture which converts wind energy into electrical energy by wind-induced fluttering motion. While some fluttering devices are arranged to flutter about a plane that is parallel with the flow direction, here we explore a dangling cross-flow stalk arrangement that is arranged to flutter about a plane perpendicular to the flow direction. This architecture amplifies the vibration by an order of magnitude, making it appropriate for low-cost organic piezomaterials. We fabricated prototypes using flexible piezoelectric materials as stalks and polymer film as leaves. A series of experiments demonstrated a peak output power of approximately 600 micro-watts and maximum power density of approximately 2 mW/cm$^3$ from a single leaf.

Solid-state wind vibration devices can harvest energy from ambient wind flows by exploiting fluttering phenomena. In some embodiments of the present invention, the fluttering piezoelectric type material member (that is, the "stalk") will have the correct geometry, connections and semi-rigidity to flutter in a cantilever motion manner. Other embodiments may flutter in other ways, such as the manner in which pliable textiles flutter. Such devices have the potential to extract energy from low velocity, irregular flows, at considerably small volumes. The key challenge in designing such fluttering energy harvesters is to reach a power density and cost effectiveness that approaches that of a conventional wind turbine.

As mentioned above, embodiments with the stalk oriented vertically, relative to a horizontal airflow seem to generally output more power than embodiments with the stalk oriented horizontally relative to the horizontal airflow. Some possible reasons for this will now be discussed. It is noted that in the research, a bluff body (that is part of the frame of the harvesting device) was interposed between the incoming airflow and the cantilever stalk and its pendular member. It is possible that this imposition of a bluff body induces vortices in the airflow in the vicinity of the cantilever stalk that help promote cantilever motion. However, the vertically oriented cantilever stalks had no such bluff body interposed, and yet still seem to out-perform the horizontal configuration. It is possible that the bluff body does not create the expected vortices, or that the vortices do not always promote cantilever motion. Regardless of the theories here, it is merely noted that bluff bodies may or may not be helpful depending upon the geometry of the vibrating element and the conditions in which it is operated.

Based on the research, it is believed that the vertical vibrating element configuration may exhibit more cantilever motion in the twisting mode of cantilever motion than does the horizontal vibrating element configuration. This may explain why the vertical configuration seems to out-perform the horizontal. To the extent this increased twisting mode motion happens, it may be the result of one or more of the following factors: the lack of imposition of a bluff body, the fact that the stalk is oriented perpendicular to the direction of the fluid stream and/or the fact that the pendular member extends from the cantilever stalk generally perpendicular to the cantilever direction.

The most likely explanation for the increased electrical energy output of the vertical stalk will now be explained. The interactions between the coupled bending torsion deformation and the aerodynamic load have the potential to trigger a much stronger flutter motion. As for the driving mechanism, the horizontal-stalk leaf is driven by the pressure difference between the two sides of leaf, and this pressure is induced by vortex shedding from the leading edge bluff body and/or the tailing edge. This kind of vibration is considered as the typical vortex-induced vibration (VIV). In contrast, at the beginning of vibration, the vertical-stalk leaf is driven by the vortex shedding from the leaf's training edge, this typical VIV could lead a small torsion and bending of the stalk. This coupled bending and torsion deformation then induces an attack angle and sideslip angle between the harvesters and the airflow. These two angles further result in aerodynamic lift and sideslip forces that eventually trigger the flutter motion. We believe that this flutter is a form of self-excited (self-induced) vibration. During flutter, the deformation/movement of the object increases an aerodynamic load which in turn drives the object to deform/move further. This process continues until it approaches dynamic stability with a large-amplitude vibration.

Figure 13:
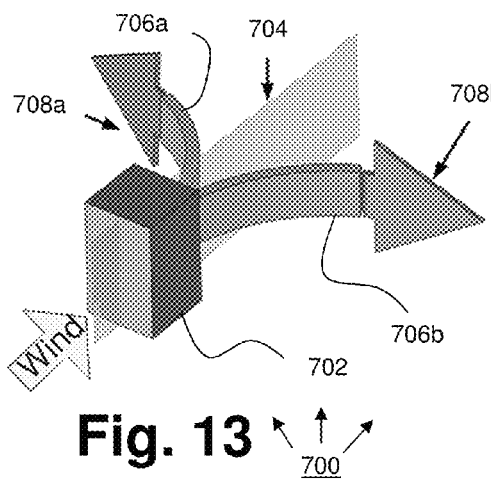
FIG. 13 is a perspective view of a portion of a fifth embodiment of a wind harvesting device according to the present invention.

FIG. 13 shows a horizontal (that is, parallel to fluid flow) vibrating element 700 including: bluff body 702; central plane 704; stalk 706 in its first extreme cantilever position 706a; stalk 706 in its second extreme cantilever position 706b; leaf 708 in its first extreme cantilever position 708a; and leaf 708 in its second extreme cantilever position 708b. FIG. 13 shows the diving board mode of cantilever motion mentioned above.

Figure 14:
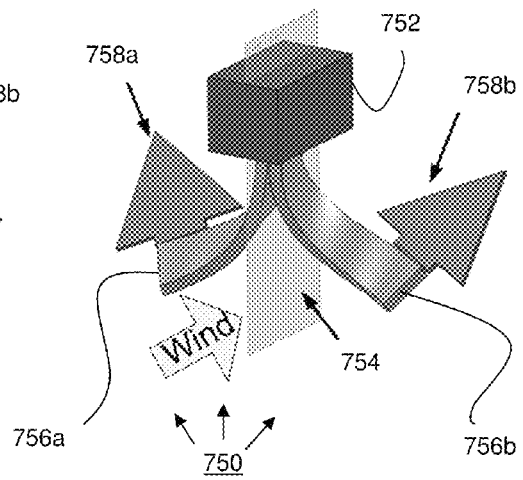
FIG. 14 is a perspective view of a portion of a fifth embodiment of a wind harvesting device according to the present invention.

FIG. 14 shows a vertical (or cross-flow, that is, perpendicular to fluid flow) vibrating element 750 including: bluff body 752; central plane 754; stalk 756 in its first extreme cantilever position 756a; stalk 756 in its second extreme cantilever position 756b; leaf 758 in its first extreme cantilever position 758a; and leaf 758 in its second extreme cantilever position 758b. FIG. 14 shows cantilever motion simultaneously in two modes: diving board mode; and twisting mode.

For the cross-flow stalk-leaf generator 750, the direction of the leaf is no longer the same as stalk, but still in the direction of the airflow. The device thus looks more like an "L" shape. In this configuration, the stalk twists as well as bends. We consider a simplified model of the coupled fluid structure system which is abstractly treated as an aerodynamic-instability driven cantilever-pendulum system. Such a system can act as either an absorber or an amplifier of vibration depending on the parametric conditions.

Figure 15:
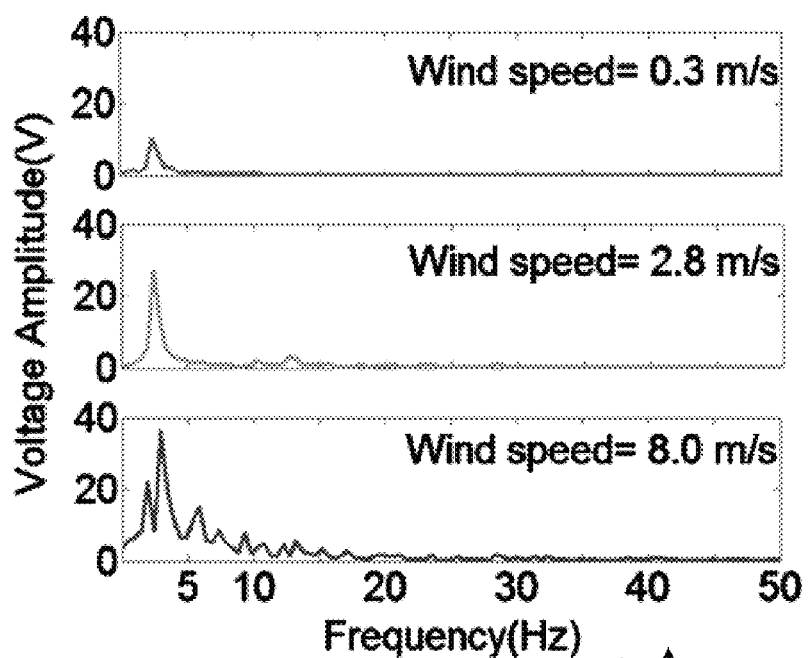
FIG. 15 is a graph of performance data appertaining to the present invention.

As discussed above, a series of experiments conducted to investigate the system properties. As shown in graph 775 of FIG. 15, a bistable response was observed. More specifically, the top plot of graph 775 shows a bistable status, the middle plot has a single stable status and the bottom plot is a chaotic multi-modals oscillation/bistable response. There exists a critical speed region where the coupled systems either stays flat or periodically bursts into large amplitude oscillations; if the wind speed is beyond the critical region and gets into the single-stable region, the leaf will flap in a periodic large-amplitude; finally, over the stable region, a chaotic multiple-modal oscillation, or even another bistable response will appear occasionally. This classical fluid-induced bistable and chaotic phenomenon has been observed by researchers in other contexts.

The output power level is sensitive to the leaf's shape. In the research, pendular elements having square, round, isosceles triangle (30 degree and 45 degree base angles), equilateral triangle and rectangle shapes were tested. The round, square and equilateral shapes all seemed to perform about the same and out-performed the other shapes. We conclude that the shapes' moment of inertia relative to the hinge's rotational axis may be a key aspect of the leaf design.

Pendular elements of similar shape, but different sizes were also tested. Perhaps not surprisingly, the pendular element with the largest area led to the largest electrical power output. As the area increases, the cut-in speed critical speed becomes higher. A larger leaf area can harvest more energy from airflow but the increased mass requires a higher wind speed to approach the critical flapping condition.

Figure 16:
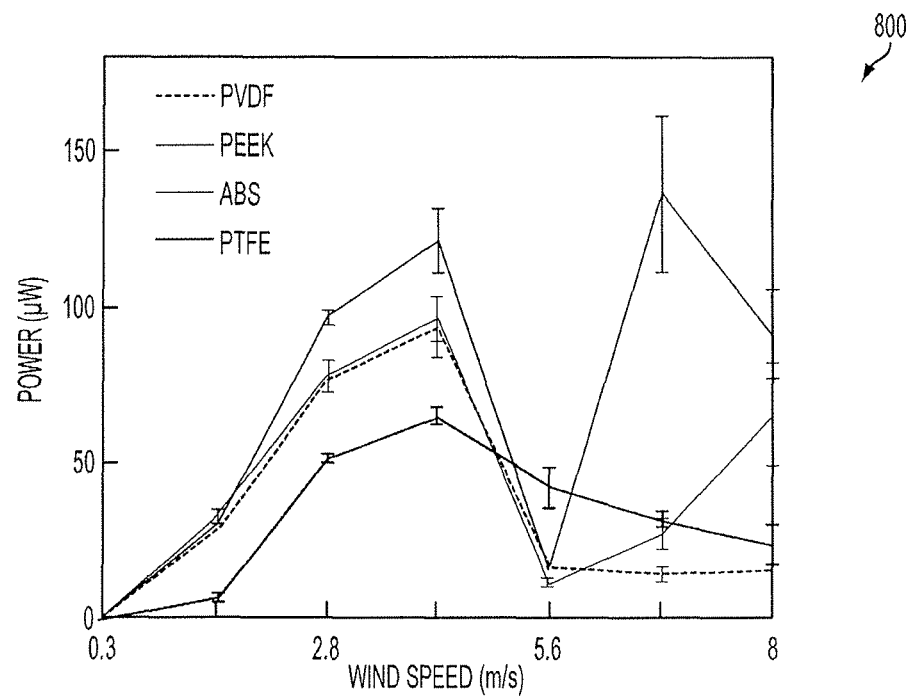
FIG. 16 is a graph of performance data appertaining to the present invention.

As shown in graph 800 of FIG. 16, various plastic materials for the leaf member were comparatively tested, specifically: PVDF, Polyetheretherketone ("PEEK"), Acrylonitrile butadiene styrene ("ABS"), and polytetrafluoroethylene ("PTFE").

Figure 17:
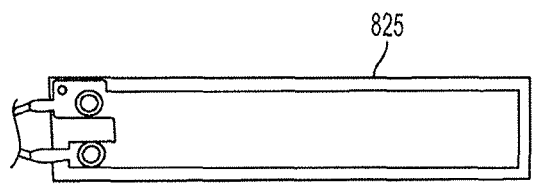
FIG. 17 is a perspective view of a portion of a sixth embodiment of a wind harvesting device according to the present invention.
Figure 18:
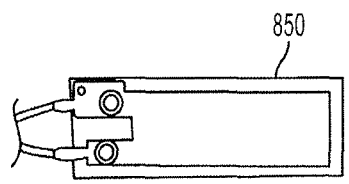
FIG. 18 is a perspective view of a portion of a seventh embodiment of a wind harvesting device according to the present invention.
Figure 19:
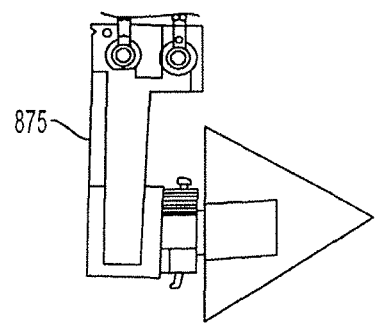
FIG. 19 is a perspective view of a portion of an eighth embodiment of a wind harvesting device according to the present invention.

FIGS. 17 to 19 show long stalk member 825; short stalk member 850; and narrow short stalk member 875. These stalks are all 205 micro-meters in thickness. All of these stalks 825, 850, 875 are elongated in the direction of their cantilever, but this is not necessarily true for all embodiments of the present invention. The three stalks were comparatively tested to determine their power density over a range of wind speeds. Stalk 875 seemed to have a power density peak at about 6.5 m/s wind speed, but stalks 825 and 850 has their highest power densities at 8 m/s, which was the maximum wind speed used during testing. For the low speed region, under 4 m/s, long stalk 825 has the highest power density, while in medium wind speeds, 4-7.5 m/s, narrow-short stalk 875 takes the lead. However, when the wind speed exceeds 7.5 m/s, short stalk 850 achieves the highest power density. These trends can be attributed to the tradeoff between the reduced length width and increased bending and/or twisting stiffness.

Figure 20:
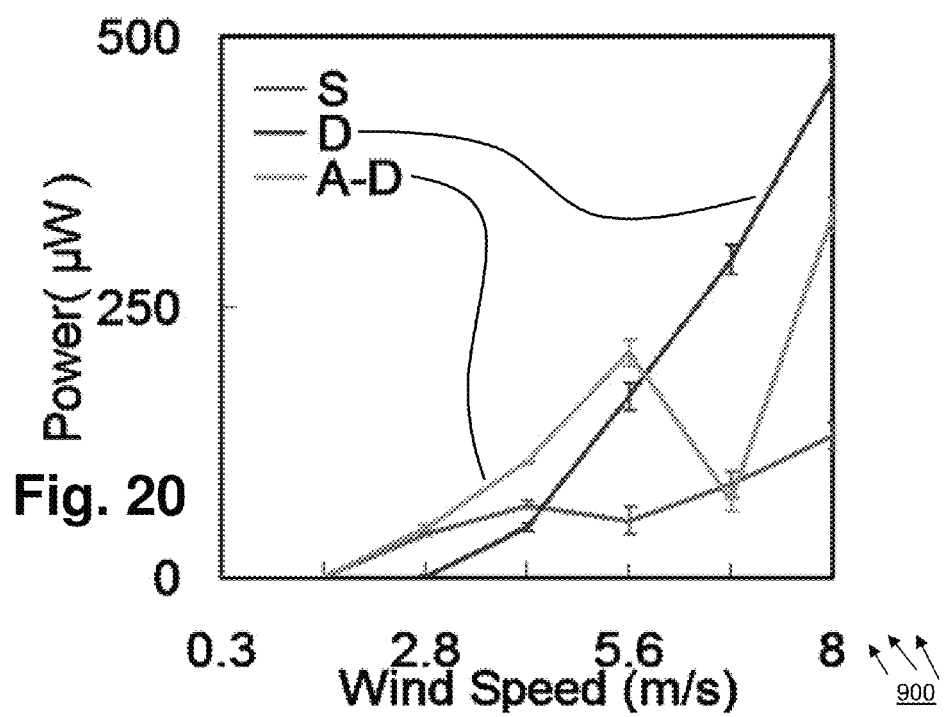
FIG. 20 is a graph of performance data appertaining to the present invention.

Comparative testing was also done between a single layer stalk (that is, a single unitary layer of piezo-electric material ("S"); an air-spaced double layer stalk ("A-D"); and an adhered double layer stalk ("D"). The laminate structure of the adhered double layer stalk and the air-spaced double layer stalk will be discussed below. Graph 900 of FIG. 20 shows the power density versus wind speed plots for these three stalk laminate arrangements. Generally, both double-layer devices produce higher power than the single layer device; however, in addition to a narrowed wind speed response band, they need a higher cut-in wind speed to get into large-amplitude oscillation. We further found an air-spaced double-layer configuration to be a good compromise with a low cut-in wind speed and a high average output power. Moreover, the double-layer stalk showed a higher peak value in a high speed wind.

When measuring power, the load can greatly affect the results. Previous research has suggested an optimized matching resistance for determining the output power of piezoelectric vibration generators. Thus, we chose the best resistance for our device in order to obtain the peak power and power density. We observed a peak power of approximately 615 micro-watts for an adhered double-layer stalk in 8 m/s wind on 5 mega-ohms load. The maximum power density was approximately 2036 micro-watts/cm$^3$ for a narrow-short stalk in 7 m/s wind under a 30 mega-ohms load. Compared to other piezomaterials-based wind energy harvesters, our devices show excellent performance in power normalized by weight, volume, and cost. These comparative results have been published at Table I, of the article "Ambient wind energy harvesting using cross-flow fluttering," JOURNAL OF APPLIED PHYSICS 109, 026104 (2011). However, our devices compare less favorably in power per swept area. We should note that the swept area performance of our devices could be improved by stacking multiple devices behind one another. Additionally, it is likely that the complex flexing dynamics cause various regions of the piezomaterial to cancel their output both longitudinally and transversally. This would imply that even greater performance could be expected from future designs with segmented electrodes or patterned poling.

While commercial wind turbines lead piezomaterials wind energy harvesters in power density, efficiency, and capacity, fluttering harvesting devices have potential advantages in compactness, robustness, and simple construction. The dangling cross-flow architecture proposed here could help to diminish this performance gap and make solid-state wind energy harvesting a more viable alternative.

Figure 21:
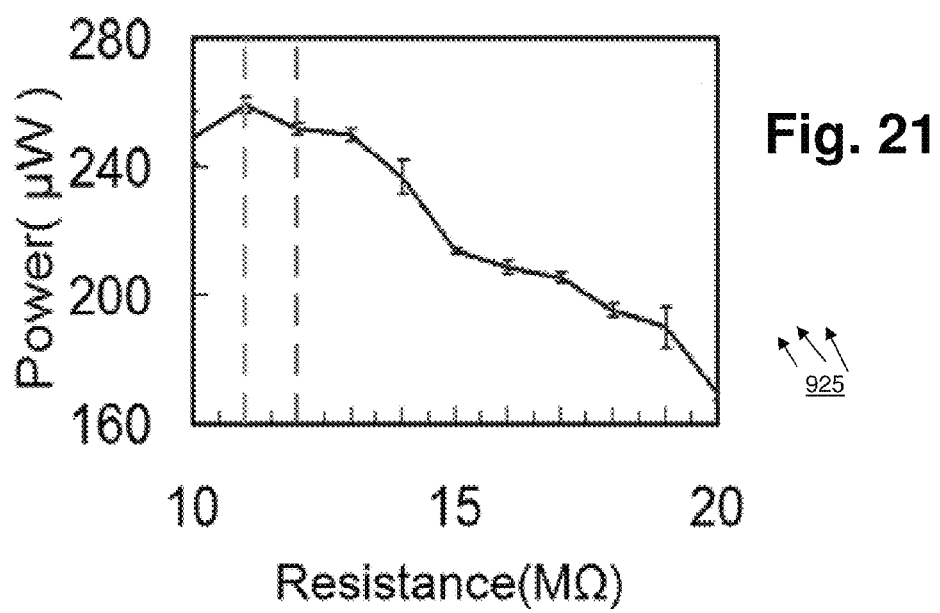
FIG. 21 is a graph of performance data appertaining to the present invention.

Some experimental results aimed at determining "optimal resistance" will now be discussed. As mentioned above, when measuring power, the load can greatly affect the results. Previous research suggested an optimized matching resistance for output power of piezoelectric based vibration generator, R0. When neglecting dielectric loss factor and damping, and as mentioned above, it could be approximately given as: $R0=1/(2\pi fC)$, where f is the frequency of vibration, and C is the capacitance of the piezoelectric element. We validated this in two experiments on a short stalk and a narrow-short stalk, as graphs 925 and 950 of FIGS. 21 and 22 show. We approached the peak values around the theoretically optimal values in both cases. More specifically, in graphs 925 and 950, the left-most dotted lines indicate peak values in actual experiments and right-most dotted lines are theoretically optimal values. The experiment of graph 925 used a short-stalk (capacitance~1.38 nF with 0.01" PEEK equilateral triangle leaf (hemline=10 cm) tests at wind speed about 8 m/s (flapping frequency~9.4 HZ). The experiment of graph 950 used a narrow-short-stalk (capacitance~0.69 nF) with same leaf as used for graph 925. These experiments validate at wind speed about 5.6 m/s (flapping frequency~5.6 HZ).

The simplified system model and its explanation on experimental results will now be discussed. When constructing a system model, we ideally assume the system is conservative, implying no dissipation of system energy by damping and friction; we also consider the leaf in pure bending and materials with liner elastic properties. We also ignored the kinetic energy of the stalk. An aero-elastic coupled system from an energy perspective represents wind-induced work to be equal to the total energy within the coupled system as Equation (3):

$$E_w = \frac{\sigma^2}{2Y}V + \frac{1}{2}J\omega^2 + U_S$$

Where the term of $E_W$ is external work done by wind; $(J\omega^2)/2$ represents the kinetic energy of the flapping leaf, in which J is moment of inertia, ω is the angular speed of flapping leaf; $(\sigma 2V)/2Y$ and $U_S$ denote the elastic potential energy (strain energy) of the leaf and piezo-stalk respectively, σ represents the point stress of the leaf, Y is the Young's modulus of leaf's materials and V represents the volume of leaf.

Based on the equation, we could roughly analyze the qualitative trends of output power. As the increasing of Y and the decreasing of J (which is in direct proportion to materials' density) on the leaf's materials, the stalk's strain energy term, $U_S$, could become more proportional to the total external work $E_W$. This would imply that more potential energy will be available for converting to electrical energy. This trend is apparent during the low wind speed region ($\leq 5$ m/s) and, with some exceptions, over other regions. Three reasons should be responsible for this: firstly, with the increasing of wind speed, the friction and damping will dissipate more energy; second, torsion modes emerge and the pure bending models are no longer representative; third, the ignored term of stalk's kinetic energy is becoming more significant.

FIG. 23 shows a cross-section of air-spaced double layer stalk 975, including: intermediate hollow layer 981; first piezo-layer 979; second piezo layer 981 and air space 983. The intermediate hollow layer generally will not be made of a piezoelectric type material, but rather made of a material that is less expensive and/or easier to fine tune with respect to properties like stiffness than a piezo-electric material would be. Adhesive connects the piezo-layers to the intermediate layer. In embodiments where the air-spaced double layer stalk must be made sufficiently rigid to act as a cantilever member, a portion of this rigidity (and perhaps even substantially all the rigidity could come from the intermediate layer. On the other hand, the intermediate layer could be structured so that it adds very little rigidity to the overall stalk member. Possible design choices are numerous. the intermediate layer is not required to be continuous (for example, it could be a series of discrete spacers). Additional air-spaced and/or adhered layers can be added to the structure, so long as it is not rendered too rigid for its expected operating conditions.

FIG. 24 shows a cross-section of adhered double layer stalk 1000, including: first piezo layer 1002 and second piezolayer 1004. These layers are adhered by adhesive, but may be able to be adhered to each other in other ways. Additional layers could be added, but care should be taken not to make the stalk too thick for its intended application.

DEFINITIONS

Any and all published documents mentioned herein shall be considered to be incorporated by reference, in their respective entireties. The following definitions are provided for claim construction purposes:

Present invention: means "at least some embodiments of the present invention," and the use of the term "present invention" in connection with some feature described herein shall not mean that all claimed embodiments (see DEFINITIONS section) include the referenced feature(s).

Embodiment: a machine, manufacture, system, method, process and/or composition that may (not must) be within the scope of a present or future patent claim of this patent document; often, an "embodiment" will be within the scope of at least some of the originally filed claims and will also end up being within the scope of at least some of the claims as issued (after the claims have been developed through the process of patent prosecution), but this is not necessarily always the case; for example, an "embodiment" might be covered by neither the originally filed claims, nor the claims as issued, despite the description of the "embodiment" as an "embodiment."

First, second, third, etc. ("ordinals"): Unless otherwise noted, ordinals only serve to distinguish or identify (e.g., various members of a group); the mere use of ordinals shall not be taken to necessarily imply order (for example, time order, space order).

Electrically Connected: means either directly electrically connected, or indirectly electrically connected, such that intervening elements are present; in an indirect electrical connection, the intervening elements may include inductors and/or transformers.

Mechanically connected: Includes both direct mechanical connections, and indirect mechanical connections made through intermediate components; includes rigid mechanical connections as well as mechanical connection that allows for relative motion between the mechanically connected components; includes, but is not limited, to welded connections, solder connections, connections by fasteners (for example, nails, bolts, screws, nuts, hook-and-loop fasteners, knots, rivets, quick-release connections, latches and/or magnetic connections), force fit connections, friction fit connections, connections secured by engagement caused by gravitational forces, pivoting or rotatable connections, and/or slidable mechanical connections.

Piezoelectric-type material: a material where at least one electrical characteristic or property varies with variations in mechanical stress or strain and/or variations in mechanical stress and/or strain cause variation in at least one electrical characteristic or property; materials with piezo properties include, but are not necessarily limited to, piezoelectric materials, reverse piezo electric materials, piezoresistive materials, reverse piezoresistive materials, piezoconductive materials and reverse piezoconductive materials.

set of terminal(s): should not be taken to necessarily imply any special sort of electrical connection hardware, such as a plug or a socket connector; for example, a length of insulated wire extending from a stalk member may be considered as a "terminal."

fluttering motion: any type of motion that may be exhibited by an object (with at least some degree of freedom of motion) that is placed in a fluid stream; "fluttering motion" includes, but is not necessarily limited to cantilever motion and/or motion of the type induced in a pliable textile material (having at least some play) by an ambient fluid flow.

Unless otherwise explicitly provided in the claim language, steps in method or process claims need only be performed that they happen to be set forth in the claim only to the extent that impossibility or extreme feasibility problems dictate that the recited step order be used. This broad interpretation with respect to step order is to be used regardless of alternative time ordering (that is, time ordering of the claimed steps that is different than the order of recitation in the claim) is particularly mentioned or discussed in this document. Any step order discussed in the above specification, and/or based upon order of step recitation in a claim, shall be considered as required by a method claim only if: (i) the step order is explicitly set forth in the words of the method claim itself; and/or (ii) it would be substantially impossible to perform the method in a different order. Unless otherwise specified in the method claims themselves, steps may be performed simultaneously or in any sort of temporally overlapping manner. Also, when any sort of time ordering is explicitly set forth in a method claim, the time ordering claim language shall not be taken as an implicit limitation on whether claimed steps are immediately consecutive in time, or as an implicit limitation against intervening steps.

What is claimed is:
1. A device comprising:
 a frame;

an elongated stalk member defining a direction of elongation, a first end and second end;
a pendular member; and
a set of electrical terminal(s)
wherein:
the stalk member comprises a frame connection portion that is at least substantially fixedly mechanically connected to the frame;
the stalk member includes a piezoelectric type material portion;
the stalk member is sized, shaped, connected, structured, located and/or has an appropriate degree of rigidity so that it will exhibit at least a first mode of cantilever motion when the device is placed in a fluid stream with the fluid stream having a first direction and the stalk member having a first orientation with respect to the fluid stream;
the piezoelectric type material portion is located so that the first mode of cantilever motion of the stalk will be transduced by the piezoelectric type material portion into transduced electrical energy;
the set of electrical terminal(s) is electrically connected to the stalk so that the transduced electrical energy is communicated to the first set of electrical terminals; and
the pendular member is mechanically connected directly to the stalk member in the vicinity of its second end and extends from the stalk member in a direction that is at least substantially parallel to the direction of elongation.

2. The device of claim 1 wherein the stalk member is generally flat and generally planar in shape.

3. The device of claim 2 wherein:
the stalk member is elongated, which elongation defines a first end and a second end; and
the frame connection portion is located at the first end.

4. The device of claim 3 wherein the stalk member is generally rectangular in shape.

5. The device of claim 2 wherein the piezoelectric portion of the stalk includes a first piezoelectric layer and a second piezoelectric layer.

6. The device of claim 5 wherein the first piezoelectric layer and the second piezoelectric layer are mechanically connected to each other by adhesive.

7. The device of claim 5 wherein the stalk includes an intermediate layer between the first piezoelectric layer and the second piezoelectric layer.

8. The device of claim 7 wherein the intermediate layer does not fill substantially an entirety of a space between the first piezoelectric layer and the second piezoelectric layer.

9. The device of claim 1 wherein the frame is structured, located and/or oriented so that the first orientation between the stalk-extension direction and an expected ambient fluid streams is at least generally perpendicular.

10. The device of claim 1 wherein the stalk member further is sized, shaped, connected, structured, located and/or has an appropriate degree of rigidity so that it will exhibit a second mode of cantilever motion when the device is placed in a fluid stream at the first orientation.

11. The device of claim 10 wherein:
the first mode of cantilever motion is a bending mode; and
the second mode of cantilever motion is a twisting mode.

12. A device comprising:
a frame;
an elongated stalk member defining a direction of elongation, a first end and second end;
a pendular member;
a set of electrical terminal(s); and
a hinge,
wherein:
the pendular member is mechanically connected to the stalk member by the hinge; the stalk member comprises a frame connection portion that is at least substantially fixedly mechanically connected to the frame at its first end so that it extends away from its fixed connection to the frame in a stalk-extension direction that is at least approximately parallel to the direction of elongation;
the stalk member includes a piezoelectric type material portion;
the stalk member is sized, shaped, connected, structured and/or located so that it will exhibit a fluttering motion when the device is placed in a fluid stream with the fluid stream having a first direction and the stalk member having a first orientation with respect to the fluid stream;
the stalk member includes a first lateral edge that is at least generally parallel to the direction of elongation;
the piezoelectric type material portion is located so that the fluttering motion of the stalk member will be transduced into transduced electrical energy;
the set of electrical terminal(s) is electrically connected to the stalk so that the transduced electrical energy is communicated to the first set of electrical terminals; and
the pendular member is mechanically connected to the stalk member at the first lateral edge in the vicinity of its second end and extends from the stalk member in a direction that is at least substantially non-parallel to the direction of elongation.

13. The device of claim 12 wherein the stalk member is generally flat and generally planar in shape.

14. The device of claim 12 wherein the frame is structured, located and/or oriented so that the first orientation between the stalk-extension direction and an expected ambient fluid streams is at least generally perpendicular.

15. The device of claim 12 wherein the stalk member is sized, shaped, connected, structured; located and/or has an appropriate degree of rigidity so that it will exhibit at least a first mode of cantilever motion when the device is placed in a fluid stream with the fluid stream at the first orientation.

16. The device of claim 12 wherein the pendular member is mechanically connected to the stalk member in the vicinity of its second end and extends from the stalk member in a direction that is at least approximately perpendicular to the direction of elongation.

17. The device of claim 12 wherein the pendular member is generally flat, generally planar and has one of the following shapes: round, square or equilateral triangle.

18. A device comprising:
a frame;
an elongated stalk member;
a pendular member;
a hinge defining at least a first axis or rotation;
and
a set of electrical terminal(s)
wherein:
the stalk member comprises a frame connection portion that is at least substantially fixedly mechanically connected to the frame;
the stalk member includes a piezoelectric type material portion;
the stalk member is sized, shaped, connected, structured and/or located so that it will exhibit a fluttering motion when the device is placed in a fluid stream with the fluid stream having a first direction and the stalk member having a first orientation with respect to the fluid stream;

the piezoelectric type material portion is located so that the fluttering motion of the stalk member will be transduced into transduced electrical energy;

the set of electrical terminal(s) is electrically connected to the stalk so that the transduced electrical energy is communicated to the first set of electrical terminals; and the pendular member is rotatably mechanically connected to the stalk member by the hinge so that the pendular member may rotate with respect to the stalk member about at least the first axis of rotation.

* * * * *